US011818517B2

(12) United States Patent
Suzuki

(10) Patent No.: US 11,818,517 B2
(45) Date of Patent: Nov. 14, 2023

(54) PROJECTOR AND PROJECTOR CONTROLLING METHOD

(71) Applicant: SEIKO EPSON CORPORATION, Tokyo (JP)

(72) Inventor: Yuki Suzuki, Oita-ken (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/830,746

(22) Filed: Jun. 2, 2022

(65) Prior Publication Data

US 2022/0394222 A1 Dec. 8, 2022

(30) Foreign Application Priority Data

Jun. 2, 2021 (JP) ................................. 2021-092959

(51) Int. Cl.
| | |
|---|---|
| *H04N 9/31* | (2006.01) |
| *G06T 7/73* | (2017.01) |
| *G06T 7/60* | (2017.01) |
| *G03B 3/04* | (2021.01) |
| *G03B 21/14* | (2006.01) |
| *G06T 7/13* | (2017.01) |

(52) U.S. Cl.
CPC ............ *H04N 9/3194* (2013.01); *G03B 3/04* (2013.01); *G03B 21/145* (2013.01); *G06T 7/13* (2017.01); *G06T 7/60* (2013.01); *G06T 7/74* (2017.01)

(58) Field of Classification Search
CPC ...... H04N 9/3194; H04N 9/3185; G06T 7/74; G06T 7/13; G06T 7/60; G03B 21/147; G03B 3/04; G03B 21/145
See application file for complete search history.

(56) References Cited

U.S. PATENT DOCUMENTS

| | | | |
|---|---|---|---|
| 7,857,464 B2* | 12/2010 | Saito | G03B 21/13 353/94 |
| 9,479,748 B2* | 10/2016 | Furui | H04N 9/3194 |
| 10,276,075 B1* | 4/2019 | Ben-Lavi | G06T 7/80 |
| 10,349,025 B2* | 7/2019 | Yoshimura | H04N 9/317 |
| 10,872,434 B2* | 12/2020 | Takao | H04N 23/60 |
| 11,184,592 B2* | 11/2021 | Ichieda | H04N 9/3152 |
| 11,503,261 B2* | 11/2022 | Ide | G03B 21/147 |
| 2004/0201823 A1* | 10/2004 | Raskar | G06F 3/011 353/69 |
| 2008/0231812 A1* | 9/2008 | Sakai | G03B 21/16 353/58 |

(Continued)

FOREIGN PATENT DOCUMENTS

| | | |
|---|---|---|
| JP | H10-185940 A | 7/1998 |
| JP | 2009-253575 A | 10/2009 |

(Continued)

*Primary Examiner* — Brian P Yenke
(74) *Attorney, Agent, or Firm* — Dority & Manning, P.A.

(57) ABSTRACT

A projector controlling method includes acquiring first imaging information obtained by capturing a first image projected from a projector at a first timing, acquiring second imaging information obtained by capturing a second image projected from the projector at a second timing, evaluating whether or not a change in the posture of the projector satisfies a certain criterion based on the first imaging information and the second imaging information, and outputting information based on the result of the evaluating.

6 Claims, 21 Drawing Sheets

(56) References Cited

U.S. PATENT DOCUMENTS

| | | | | |
|---|---|---|---|---|
| 2011/0228175 A1* | 9/2011 | Nicoli | H04N 9/3173 | 348/E3.048 |
| 2012/0069308 A1* | 3/2012 | Satake | G06F 3/017 | 353/119 |
| 2013/0128240 A1* | 5/2013 | Yoshida | G03B 21/28 | 353/121 |
| 2013/0244733 A1* | 9/2013 | Ueno | H04N 9/3194 | 455/566 |
| 2015/0092113 A1* | 4/2015 | Deng | A63F 13/25 | 348/744 |
| 2015/0138071 A1* | 5/2015 | Ichieda | G03B 21/14 | 345/156 |
| 2015/0177601 A1* | 6/2015 | Imai | G03B 21/142 | 353/121 |
| 2015/0187057 A1* | 7/2015 | Kobayashi | H04N 9/3185 | 345/647 |
| 2016/0094821 A1* | 3/2016 | Mori | H04N 9/3147 | 353/30 |
| 2016/0366384 A1* | 12/2016 | Miyata | H04N 9/3194 | |
| 2017/0041580 A1* | 2/2017 | Ohira | H04N 9/3147 | |
| 2017/0054954 A1* | 2/2017 | Keitler | H04N 17/002 | |
| 2017/0237955 A1* | 8/2017 | Koyama | H04N 9/3188 | 348/745 |
| 2018/0139422 A1* | 5/2018 | Moule | G06T 7/13 | |
| 2019/0025681 A1* | 1/2019 | Ida | G09G 5/38 | |
| 2019/0102907 A1* | 4/2019 | Someya | G09G 3/001 | |
| 2019/0116356 A1* | 4/2019 | Matoba | H04N 9/3102 | |
| 2020/0107000 A1* | 4/2020 | Ishii | G09G 3/36 | |
| 2020/0228767 A1* | 7/2020 | Ichieda | H04N 9/3194 | |
| 2020/0257186 A1* | 8/2020 | Fukushima | G01N 33/28 | |
| 2021/0392307 A1* | 12/2021 | Sandow | G06V 20/20 | |
| 2022/0057892 A1* | 2/2022 | Ikeda | G06F 3/0346 | |
| 2022/0094894 A1* | 3/2022 | Zhou | H04N 9/3173 | |
| 2023/0109225 A1* | 4/2023 | Hödlmoser | G06T 7/74 | 73/1.01 |

FOREIGN PATENT DOCUMENTS

| | | |
|---|---|---|
| JP | 2010-066354 A | 3/2010 |
| JP | 2014-106410 A | 6/2014 |

\* cited by examiner

PROJECTOR AND PROJECTOR CONTROLLING METHOD

The present application is based on, and claims priority from JP Application Serial Number 2021-092959, filed Jun. 2, 2021, the disclosure of which is hereby incorporated by reference herein in its entirety.

BACKGROUND

1. Technical Field

The present disclosure relates to a projector and a projector controlling method.

2. Related Art

Projectors are each generally installed, for example, at a ceiling, a wall, or a desk when used. For example, JP-A-2010-066354 discloses a technology for suspending and installing a projector via an existing ceiling suspender.

When a projector is installed, for example, at a ceiling, a wall, or a desk, however, the posture of the projector changes in some cases.

SUMMARY

An aspect of a projector controlling method according to the present disclosure includes acquiring first imaging information representing a result of image capture of a first image projected from a projector at a first timing, acquiring second imaging information representing a result of image capture of a second image projected from the projector at a second timing, evaluating whether or not a change in a posture of the projector satisfies a certain criterion based on the first and second imaging information, and outputting information based on a result of the evaluation.

An aspect of a projector according to the present disclosure is a projector including an acquisition section that acquires first imaging information representing a result of image capture of a first image projected from the projector at a first timing and second imaging information representing a result of image capture of a second image projected from the projector at a second timing from an imaging apparatus fixed to the projector, an evaluation section that evaluates whether or not a change in a posture of the projector satisfies a certain criterion based on the first and second imaging information, and an output section that outputs information based on an evaluation result generated by the evaluation section in accordance with the evaluation result.

Another aspect of the projector according to the present disclosure is a projector including an acquisition section that acquires first imaging information representing a result of image capture of a first image projected from the projector at a first timing and second imaging information representing a result of image capture of a second image projected from the projector at a second timing from an imaging apparatus fixed to a location other than the projector, an evaluation section that evaluates whether or not a change in a posture of the projector satisfies a certain criterion based on the first and second imaging information, and an output section that outputs information based on an evaluation result generated by the evaluation section in accordance with the evaluation result.

DESCRIPTION OF EXEMPLARY EMBODIMENTS

Figure 1:
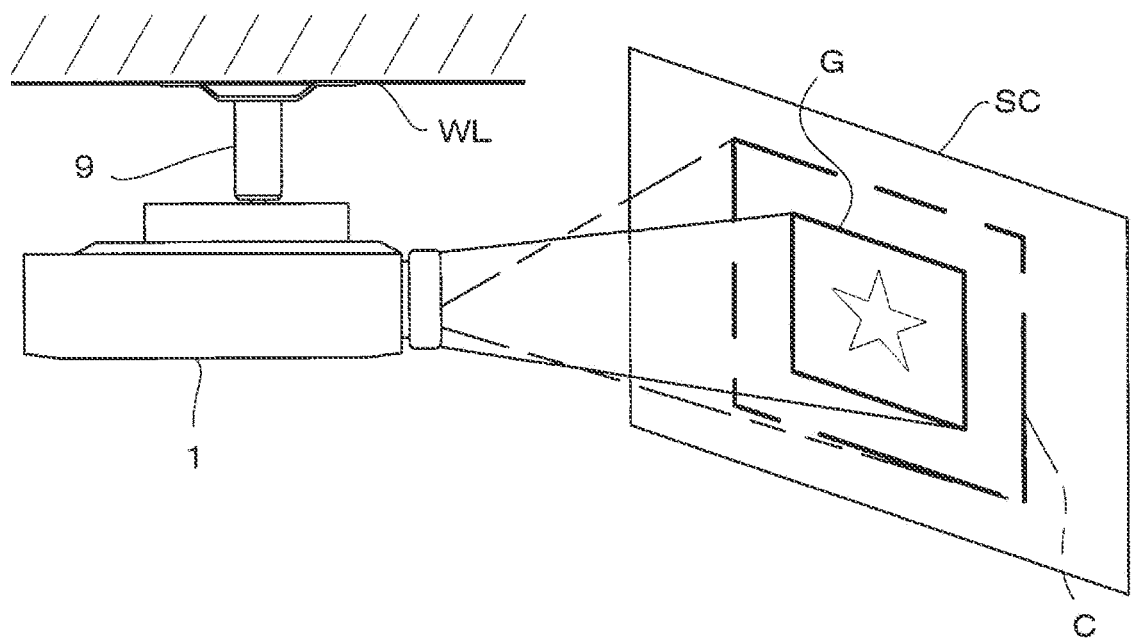
FIG. 1 is a descriptive diagram schematically showing a projector according to a first embodiment of the present disclosure.

Preferable embodiments according to the present disclosure will be described below with reference to the accompanying drawings. In the drawings, the dimensions and scale of each portion differ from actual values in some cases, and some of the portions are diagrammatically drawn in some cases for ease of understanding. The scope of the present disclosure is not limited to the embodiments unless particular restrictions on the present disclosure are made in the following description.

1. First Embodiment

1.1. Overview of Projector

FIG. 1 schematically describes a projector 1 according to a first embodiment. The projector 1 is fixed to a ceiling WL via an installer 9. The installer 9 includes a dedicated fixture, male and female screws that fix the dedicated fixture to the ceiling WL, and male and female screws that fix the projector 1 to the dedicated fixture. The installer 9 may be a component that fixes the projector 1 directly to the ceiling via no dedicated fixture or any other component. The projector 1 may instead be installed at a wall, a pillar, or a beam, or, for example, at a desk, a shelf, a floor, or a cart.

The projector 1 can project a projection image G on a screen SC. The projector 1 can acquire a captured image C, which is an image of the projection image G. The projection image G may change in terms of coordinates of the vertices, area, shape, luminance, and other factors in accordance with a change in the posture of the projector 1.

Figure 2:
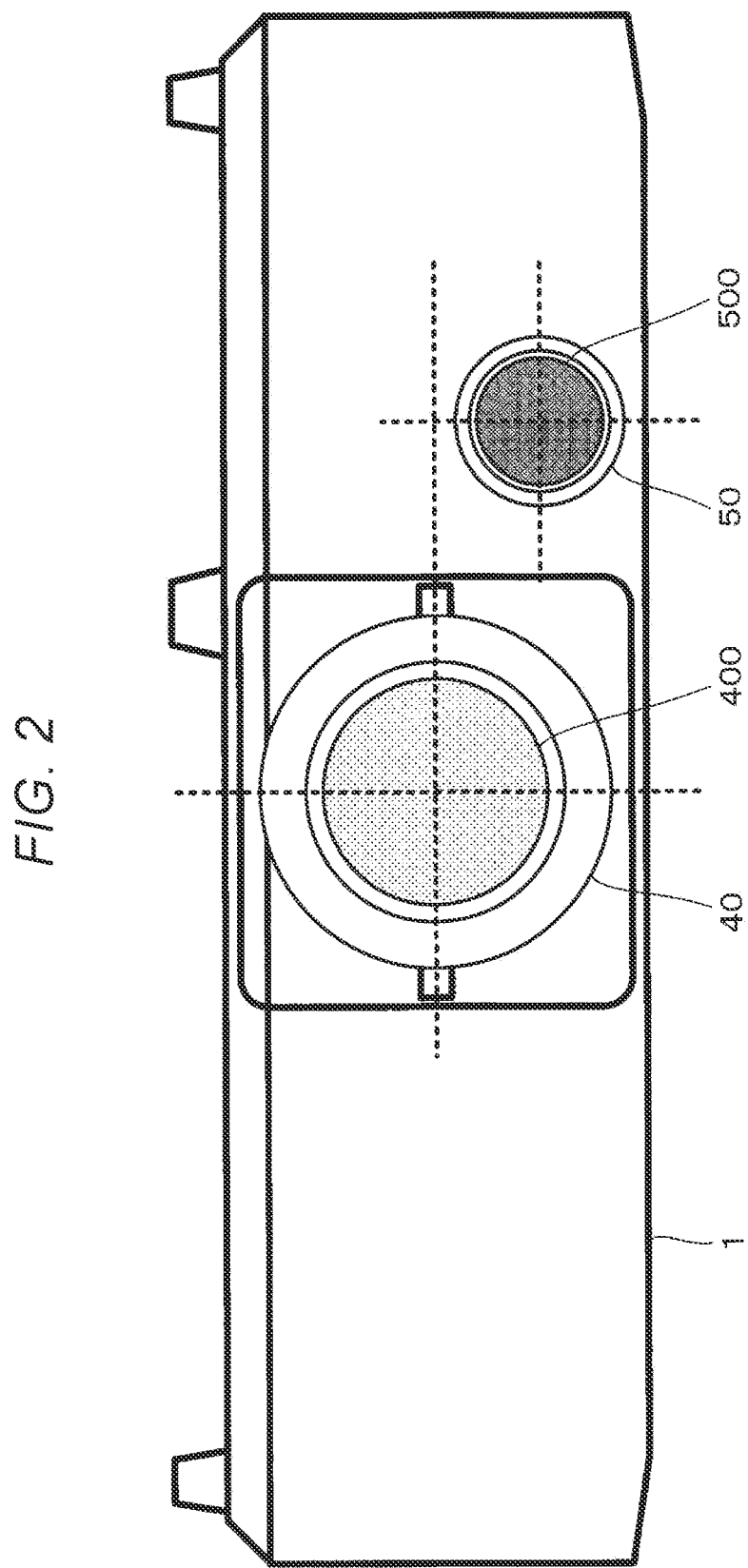
FIG. 2 is a descriptive diagram showing a surface of the projector according to the first embodiment of the present disclosure, the surface facing a screen.

FIG. 2 shows a surface of the projector 1 according to the first embodiment, the surface facing the screen SC. The surface of the projector 1 facing the screen SC is hereinafter referred to as a front surface of the projector 1 in some cases. The front surface of the projector 1 includes a projection lens 400, which is provided in a projection section 40, which projects the projection image G on the screen SC, and an imaging lens 500, which is provided in an imaging apparatus 50, which acquires the captured image C. The projection lens 400 and the imaging lens 500 are preferably provided in different positions at the front surface of the projector 1, as shown in FIG. 2. FIG. 2 shows the case where the imaging lens 500 is provided at the front surface of the projector 1, and the imaging lens 500 may instead be provided at a location other than the front surface of the projector 1.

1.2. Configuration of Projector

Figure 3:
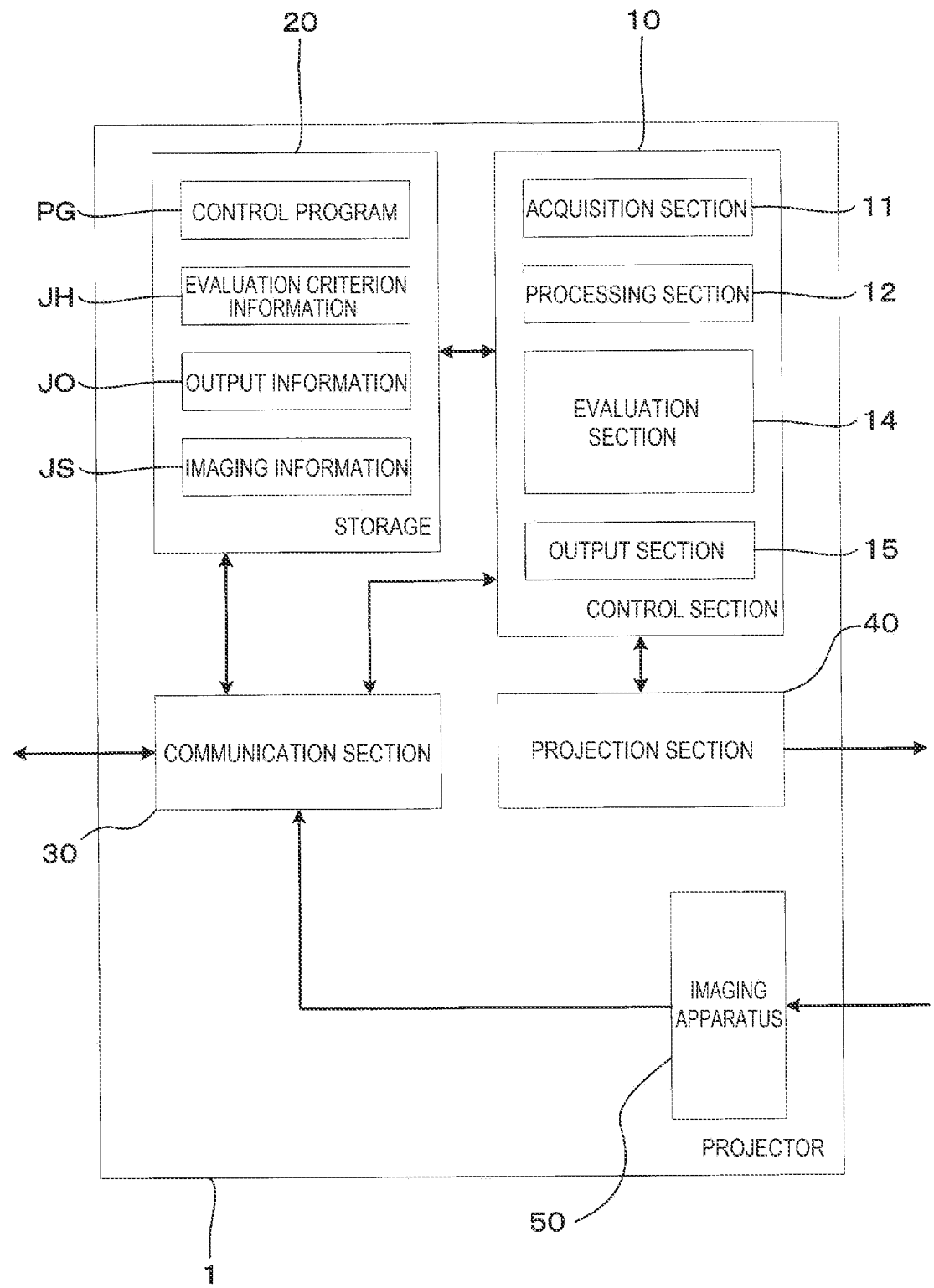
FIG. 3 is a block diagram showing an example of the configuration of the projector according to the first embodiment of the present disclosure.

FIG. 3 is a block diagram showing an example of the configuration of the projector 1 according to the first embodiment. The projector 1 includes a control section 10, which controls the projector 1, a storage 20, which stores a variety of pieces of information, a communication section 30, which performs communication with an external terminal or any other device, the projection section 40, which projects the projection image G, and the imaging apparatus 50, which acquires the captured image C.

The storage 20 includes, for example, a RAM and a ROM. The RAM is an abbreviation for Random Access Memory, and the ROM is an abbreviation for Read Only Memory. The storage 20 stores a control program PG, evaluation criterion information JH, and output information JO. The storage 20 further stores imaging information JS, which is information representing the captured image C acquired by the imaging apparatus 50. Part or entirety of the storage 20 may be provided, for example, in an external storage apparatus or an external server.

The control section 10 includes one or more CPUs. It is, however, noted that the control section 10 may include a programmable logic device, such as an FPGA, in place of or in addition to the CPU or CPUs. The CPU is an abbreviation for Central Processing Unit, and FPGA is an abbreviation for Field-Programmable Gate Array. The control section 10 functions as an acquisition section 11, a processing section 12, an evaluation section 14, and an output section 15 when the CPU or any other component provided in the control section 10 executes the control program PG and operates in accordance with the control program PG.

The acquisition section 11 acquires information received by the communication section 30, for example, the imaging information JS, which is information representing the captured image C acquired by the imaging apparatus 50, and an image signal or any other piece of information based on which the projection image G is formed, and causes the storage 20 to store the acquired information.

The processing section 12 performs signal processing on the image signal acquired by the acquisition section 11 to generate projection image information representing the projection image G.

The evaluation section 14 evaluates whether or not the change in the posture of the projector 1 satisfies a certain criterion based on the imaging information JS acquired by the acquisition section 11 and the evaluation criterion information JH stored in the storage 20. The evaluation section 14 generates evaluation result information based on the result of the evaluation. The evaluation criterion information JH contains information on a method for selecting the imaging information JS to be used in the evaluation, information on a method for performing the evaluation, information on a threshold for evaluation of whether or not the change in the posture of the projector 1 satisfies the certain criterion, and other pieces of information.

The output section 15 outputs the output information JO, which is information based on the evaluation result information in accordance with the result of the evaluation performed by the evaluation section 14. The output information JO may be image information, text information, or audio information. The output information JO may be projected from the projection section 40 onto the screen SC, transmitted via the communication section 30 to an external terminal such as a smartphone or personal computer and displayed on a display provided in the external terminal, or issued from an acoustic instrument such as a loudspeaker.

The communication section 30 includes, for example, an interface substrate including a connector and an interface circuit, and has the function of receiving a variety of pieces of information, for example, from the external terminal, the imaging apparatus 50, and the external storage apparatus or the external server, and the function of transmitting a variety of information, for example, to the external terminal, the acoustic instrument, and the external storage apparatus or the external server. The communication section 30 may transmit and receive the information via input/output terminals such as USB, HDMI, or LAN terminals, or may transmit and receive the information via wireless communication using Bluetooth or any other communication standard. USB is an abbreviation for Universal Serial Bus, HDMI is an abbreviation for High-Definition Multimedia Interface, and LAN is an abbreviation for Local Area Network. USB, HDMI, and Bluetooth are registered trademarks.

The projection section 40 includes a light source apparatus including a halogen lamp, a xenon lamp, an ultrahigh-pressure mercury lamp, an LED, a laser light source, or any other light source, an optical modulator that generates image light, and a projection system that projects the image light onto the screen SC. The light modulator, which generates the image light, includes a DMD, liquid crystal panel, or any other component, and the projection system includes the projection lens 400. LED is an abbreviation for Light Emitting Diode, and DMD is an abbreviation for Digital Mirror Device. The projection section 40 projects the projection image G onto the screen SC based on the projection image information generated by the processing section 12.

The imaging apparatus 50 captures an image of the projection image G projected on the screen SC. The imaging apparatus 50 thus acquires the captured image C. The imaging apparatus 50 includes the imaging lens 500 and an imaging device that is not shown. The imaging device is an image sensor, for example, a CCD or a CMOS device. CCD is an abbreviation for Charge Coupled Device, and CMOS is an abbreviation for Complementary Metal Oxide Semiconductor. The imaging apparatus 50 may be provided at a location outside the projector 1. Specifically, the imaging apparatus 50 may be fixed to the outer side of an enclosure of the projector 1. The imaging apparatus 50 is, for example, a camera.

Figure 4:
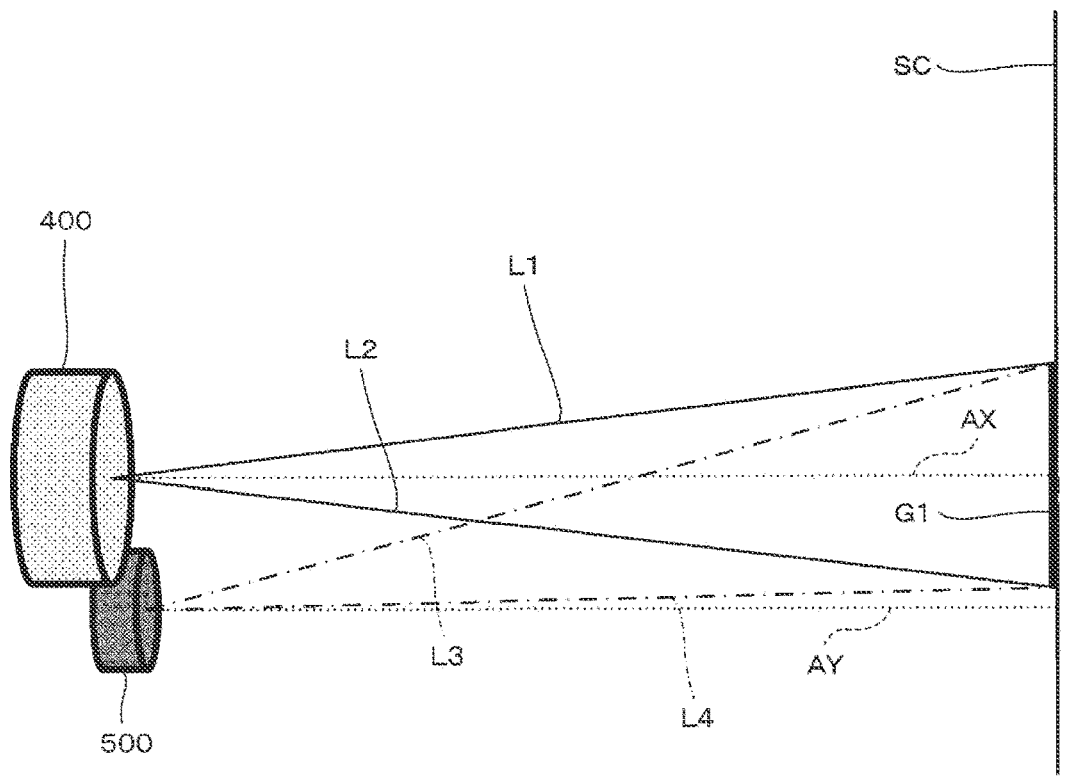
FIG. 4 is a descriptive diagram showing how the projector according to the first embodiment projects an image and captures an image of the projected image.
Figure 5:
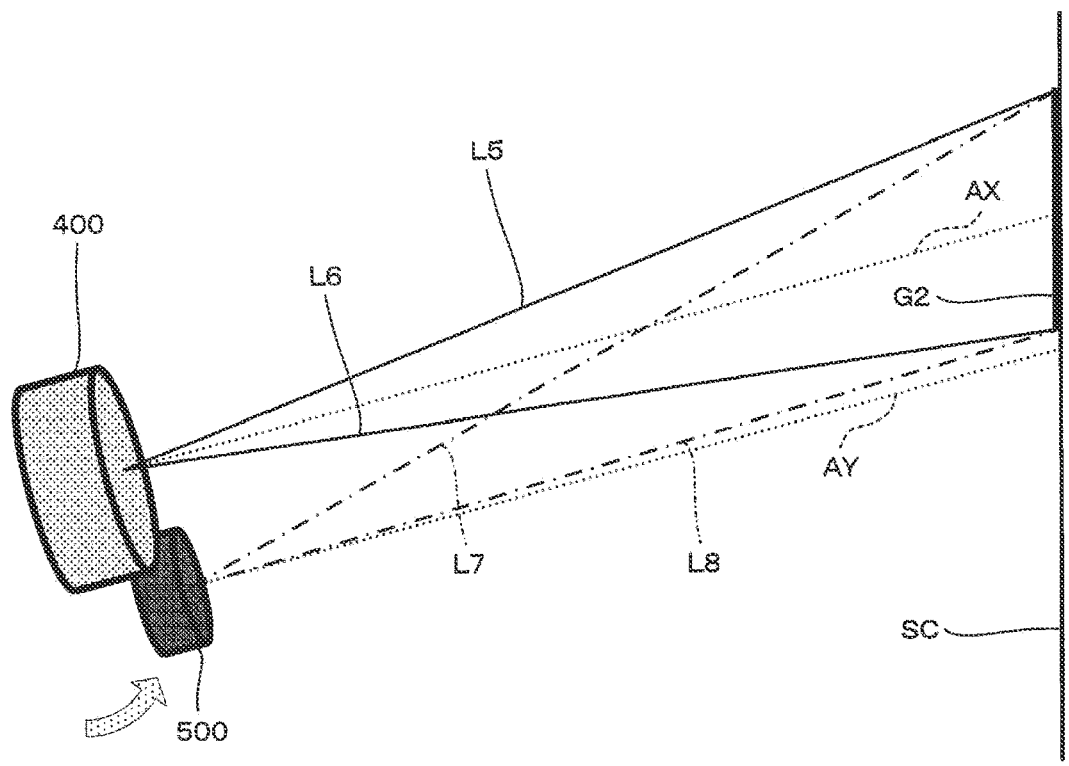
FIG. 5 is a descriptive diagram showing how the projector according to the first embodiment projects an image and captures an image of the projected image.
Figure 6:
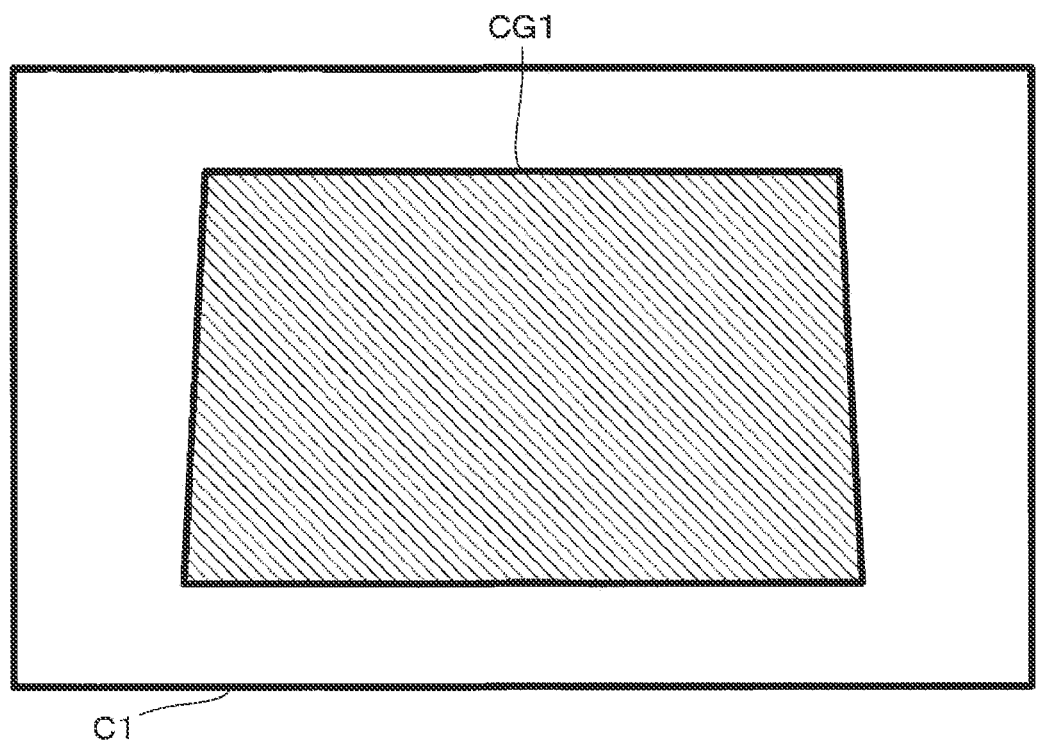
FIG. 6 is a descriptive diagram showing the projection image recorded in a captured image.
Figure 7:
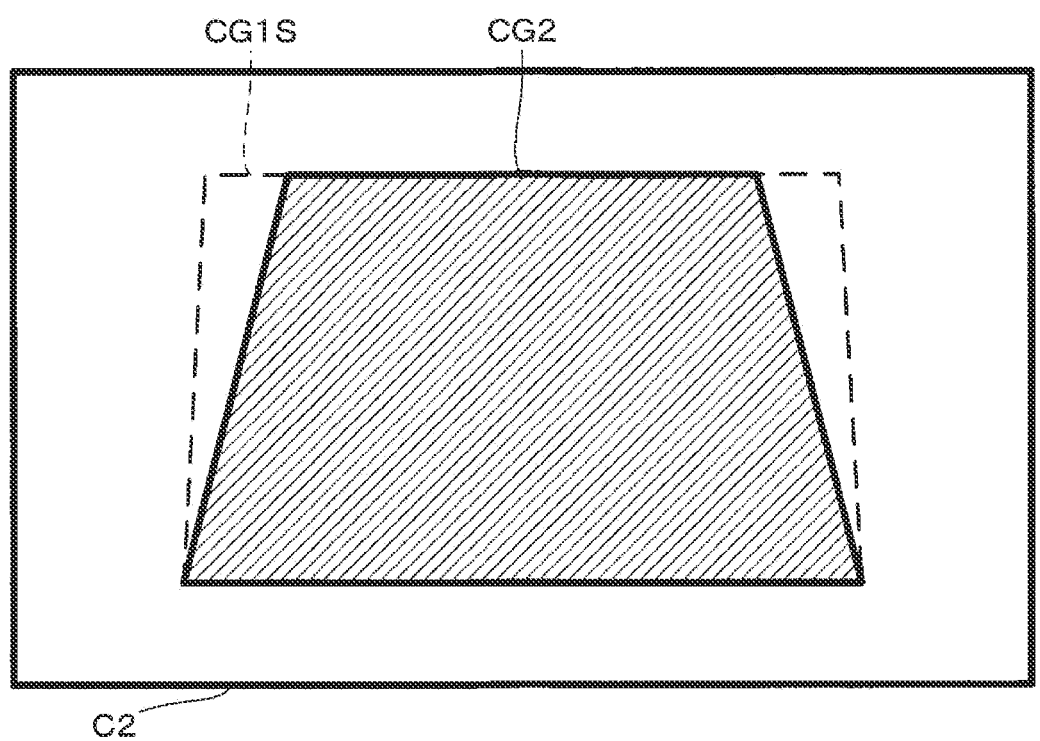
FIG. 7 is a descriptive diagram showing the projection image recorded in the captured image.

1.3. Change in Posture of Projector, and Change in Projection Image Recorded in Captured Image FIGS. 4 and 5 show the projection image G projected from the projector 1 onto the screen SC, and how the imaging apparatus 50 captures an image of the projection image G. FIGS. 6 and 7 show the projection image G recorded in the captured image C.

FIG. 4 shows that the projector 1 and the screen SC are so disposed that the front surface of the projector 1 faces the screen SC, and that an optical axis AX of the projection lens 400 and an optical axis AY of the imaging lens 500 are perpendicular to the screen SC. That is, the optical axis AX and the optical axis AY are parallel to each other. FIG. 4 also shows that the imaging lens 500 is provided in a position different in the vertical direction from the position of the projection lens 400 when the front surface of the projector 1 is viewed in the direction perpendicular to the front surface of the projector 1. In FIG. 4, the projection image G projected from the projection section 40 onto the screen SC is referred to as a projected image G1. Let L1 be the distance from the intersection of the projection lens 400 and the optical axis AX to the upper edge of the projected image G1, as shown in FIG. 4. Let L2 be the distance from the intersection of the projection lens 400 and the optical axis AX to the lower edge of the projected image G1. Let L3 be the distance from the intersection of the imaging lens 500 and the optical axis AY to the upper edge of the projected image G1. Let L4 be the distance from the intersection of the imaging lens 500 and the optical axis AY to the lower edge of the projected image G1.

FIG. 5 shows that the posture of the projector 1 has changed from the posture shown in FIG. 4, and that the intersection of the optical axis AX and the screen SC has moved in the direction opposite to the vertical direction relative to the intersection of the optical axis AX and the projection lens 400. In FIG. 5, the relative positional relationship between the imaging lens 500 and the projection lens 400 is not changed from that in FIG. 4, the optical axis AY and the optical axis AX remain parallel to each other, and the distance between the optical axis AY and the optical axis AX is fixed. In FIG. 5, the projection image G projected from the projection section 40 onto the screen SC is referred to as a projected image G2. Let L5 be the distance from the intersection of the projection lens 400 and the optical axis AX to the upper edge of the projected image G2, as shown in FIG. 5. Let L6 be the distance from the intersection of the projection lens 400 and the optical axis AX to the lower edge of the projected image G2. Let L7 be the distance from the intersection of the imaging lens 500 and the optical axis AY to the upper edge of the projected image G2. Let L8 be the distance from the intersection of the imaging lens 500 and the optical axis AY to the lower edge of the projected image G2.

FIG. 6 shows the captured image C1, which is an image, captured by the imaging apparatus 50 including the imaging lens 500, of the projected image G1 projected on the screen SC in FIG. 4, and an image CG1 recorded in the captured image C1. The image CG1 corresponds to the projected image G1 recorded in the captured image C1.

FIG. 7 shows a captured image C2, which is an image, captured by the imaging apparatus 50 including the imaging lens 500, of the projected image G2 projected on the screen SC in FIG. 5, and an image CG2 recorded in the captured image C2. The image CG2 corresponds to the projected image G2 recorded in the captured image C2. The images CG1 and CG2 are hereinafter collectively referred to as images CG. To compare the shapes of the images CG1 and CG2 with each other, a shape CG1S similar to the shape of the image CG1 is so drawn with a broken line in FIG. 7 that the lower edge of the shape CG1S coincides with the lower edge of the image CG2. In FIGS. 6 and 7, the downward direction in the plane of view is the vertical direction.

When the posture of projector 1 changes from the state shown in FIG. 4 to the state shown in FIG. 5, the shape of image CG1 changes to the shape of image CG2, and the ratio of the length of the upper edge to the lower edge of the image CG2 becomes smaller than the ratio of the length of the upper edge to the lower edge of the image CG1. Since the shape of an image of the projection image G changes as the posture of the projector 1 changes as described above, the change in the posture of the projector 1 can be grasped based on the changes in the shapes of the images CG recorded in the captured image C.

When the ratio of the distance L5 to the distance L6 is greater than the ratio of the distance L1 to the distance L2, the ratio of the length of the upper edge to the lower edge of the projected image G2 is greater than the ratio of the length of the upper edge to the lower edge of the projected image G1. When the ratio of the length of the upper edge to the lower edge of the projected image G2 is equal to the ratio of the length of the upper edge to the lower edge of the projected image G1, and the ratio of the distance L7 to the distance L8 is greater than the ratio of the distance L3 to the distance L4 due to the effect of perspective projection, the ratio of the length of the upper edge to the lower edge of the image CG2 is smaller than the ratio of the length of the upper edge to the lower edge of the image CG1. Based on the aforementioned combinations of the correspondences between the ratios, the shape of the image CG1 recorded in the captured image C1 changes to the shape of the image CG2 recorded in the captured image C2.

1.4. Action of Projector

Figure 8:
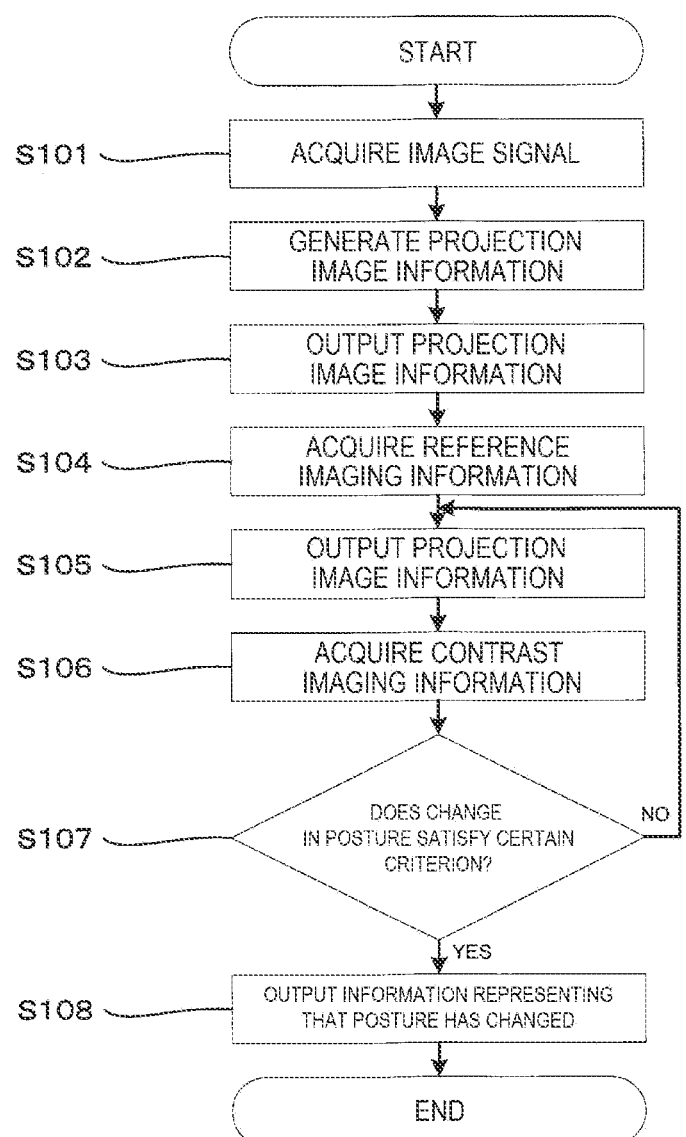
FIG. 8 is a flowchart for describing an overview of the action of the projector according to the first embodiment.

FIG. 8 is a flowchart for describing an overview of the action of the projector 1 according to the first embodiment. A series of actions shown in the flowchart is initiated, for example, when the projector 1 is powered on and the communication section 30 receives an image signal.

First, in step S101, the acquisition section 11 acquires the image signal received by the communication section 30. Thereafter, in step S102, the processing section 12 performs signal processing on the image signal acquired by the acquisition section 11 to generate the projection image information representing the projection image G.

In step S103, the output section 15 outputs the projection image information generated by the processing section 12 to the projection section 40. The projection section 40 projects the projection image G onto the screen SC based on the projection image information. The projection image G based on the projection image information outputted by the output section 15 in step S103 is referred to as a first image in some cases. In step S104, the acquisition section 11 acquires reference imaging information. The reference imaging information is the imaging information JS representing the captured image C that is an image, captured by the imaging apparatus 50, of the first image projected on the screen SC in step S103. The timing at which the acquisition section 11 acquires the imaging information JS in step S104 is referred to as a first timing in some cases. The imaging information JS acquired by the acquisition section 11 in step S104 is referred to as first imaging information in some cases.

Thereafter, in step S105, the output section 15 outputs the projection image information generated by the processing section 12 to the projection section 40. The projection section 40 projects the projection image G onto the screen SC based on the projection image information. The projection image G based on the projection image information outputted by the output section 15 in step S105 is referred to as a second image in some cases. In step S106, the acquisition section 11 acquires contrast imaging information. The contrast imaging information is the imaging information JS representing the captured image C that is an image, captured by the imaging apparatus 50, of the second image projected on the screen SC in step S105. The timing at which the acquisition section 11 acquires the imaging information JS in step S106 is referred to as a second timing in some cases. The imaging information JS acquired by the acquisition section 11 in step S106 is referred to as second imaging information in some cases.

In step S107, the evaluation section 14 evaluates whether or not the change in the posture of the projector 1 satisfies the certain criterion based on the reference imaging information acquired by the acquisition section 11 in step S104, the contrast imaging information acquired by the acquisition section 11 in step S106, and the evaluation criterion information JH stored in the storage 20. Thereafter, in step S107, the evaluation section 14 generates the evaluation result information based on the result of the evaluation. When the result of the evaluation in step S107 is negative, that is, when the result is NO in step S107, the control section 10 proceeds to the process in step S105. When the result of the evaluation in step S107 is affirmative, that is, when the result is YES in step S107, the control section 10 proceeds to the process in step S108.

In step S108, the output section 15 outputs the output information JO based on the evaluation result information generated by the evaluation section 14 in step S107. The control section 10 then terminates the series of actions shown in the flowchart.

Figure 9:
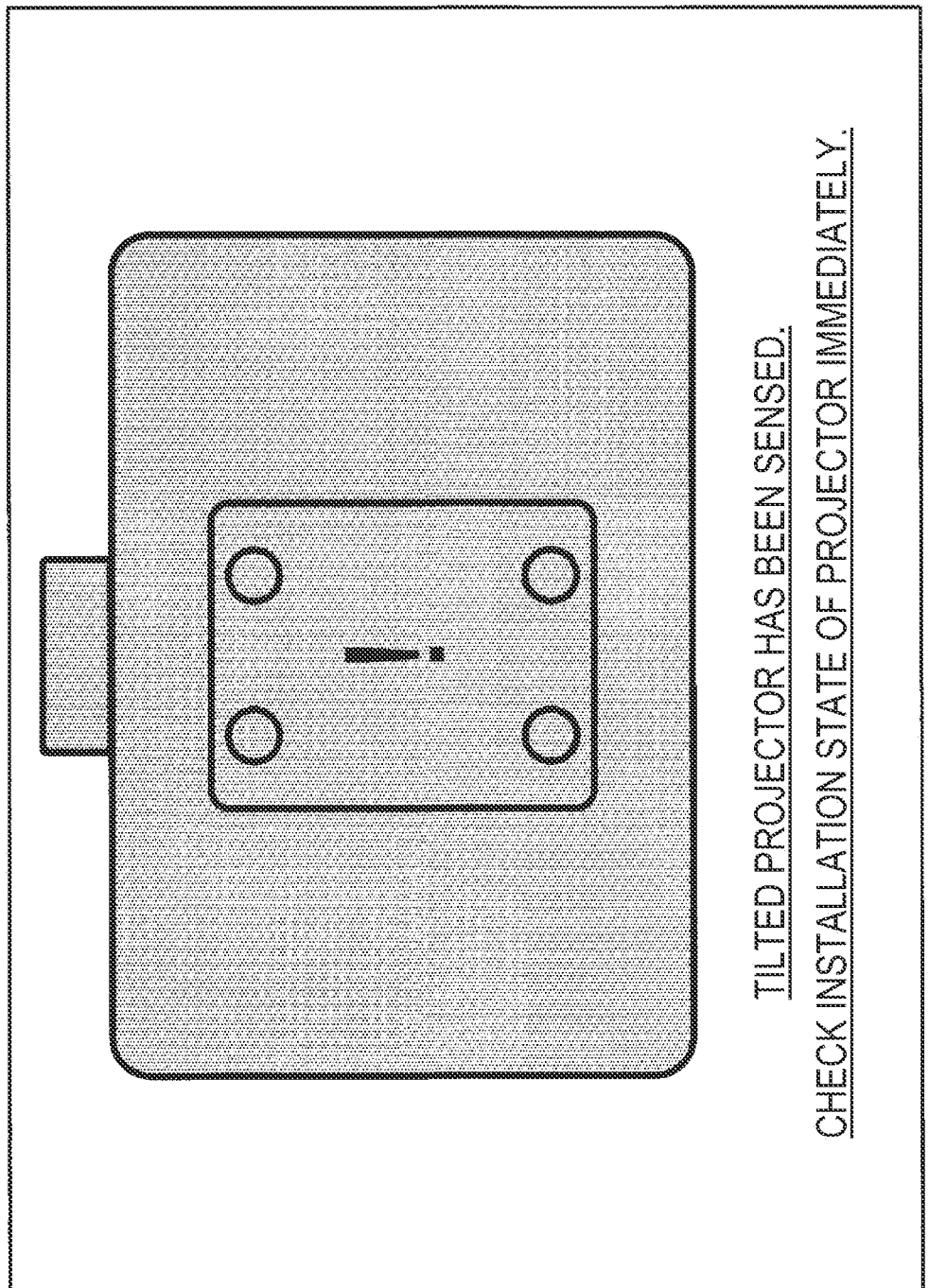
FIG. 9 is a descriptive diagram showing an example of output information.

FIG. 9 shows output information JO1, which is an example of the output information JO outputted by the output section 15 in step S108 of FIG. 8. The output information JO1 shown in FIG. 9 is image information that notifies that the posture of the projector 1 has changed. The output information JO may be information that prompts a user to check the installation state of the projector 1, or may be information that prompts the user to keep a distance from the projector 1.

According to the first embodiment, when the change in the posture of the projector 1 satisfies the certain criterion, the output section 15 outputs the output information JO, whereby the user of the projector 1 can readily grasp that the posture of the projector 1 has changed. The user can therefore readily prevent the posture of the projector 1 from continuously changing. Furthermore, according to the first embodiment, a decrease in the image quality of the projection image G due to the change in the posture of the projector 1 can be readily suppressed.

As described above, the method for controlling the projector 1 according to the first embodiment includes acquiring the reference imaging information representing the result of image capture of the first image projected from the projector 1 at the first timing, acquiring the contrast imaging information representing the result of image capture of the second image projected from the projector 1 at the second timing, evaluating whether or not the change in the posture of the projector 1 satisfies a certain criterion based on the reference imaging information and the contrast imaging information, and outputting the output information JO based on the result of the evaluation in accordance with the result of the evaluation.

The projector 1 according to the first embodiment includes the acquisition section 11, which acquires the reference imaging information representing the result of image capture of the first image projected from the projector 1 at the first timing and acquires the contrast imaging information representing the result of image capture of the second image projected from the projector 1 at the second timing from the imaging apparatus 50 fixed to the projector 1, the evaluation section 14, which evaluates whether or not the change in the posture of the projector 1 satisfies the certain criterion based on the reference imaging information and the contrast imaging information, and the output section 15, which outputs the output information JO based on the result of the evaluation performed by the evaluation section 14 in accordance with the result of the evaluation.

The user of the projector 1 can thus grasp that the posture of the projector 1 has changed.

2. Second Embodiment

A second embodiment of the present disclosure will be described below. In the embodiments presented below by way of example, an element having the same effect and function as those in the first embodiment has the same reference character used in the description of the first embodiment, and no detailed description of the same element will be made as appropriate.

Figure 10:
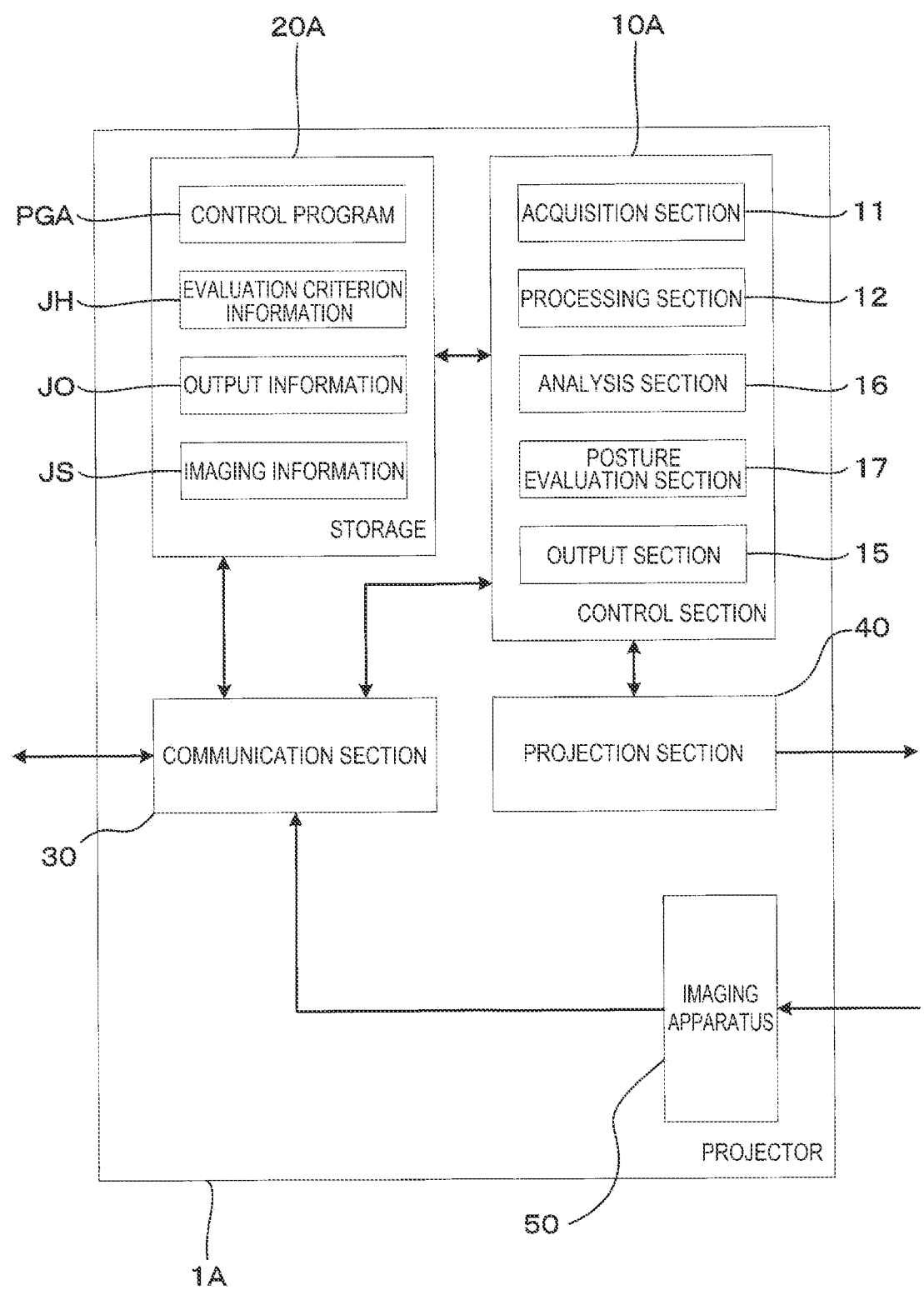
FIG. 10 is a block diagram showing an example of the configuration of a projector according to a second embodiment.

FIG. 10 is a block diagram showing an example of the configuration of a projector 1A according to the second embodiment. The projector 1A has the same configuration as that of the projector 1 according to the first embodiment except that the projector 1A includes a control section 10A in place of the control section 10 and a storage 20A in place of the storage 20, as shown in FIG. 10. Out of the control section 10A and the storage 20A, the control section 10A has the same configuration as that of the control section 10 according to the first embodiment except that the evaluation section 14 is replaced with an analysis section 16 and a posture evaluation section 17. The storage 20A has the same configuration as that of the storage 20 according to the first embodiment except that the storage 20A stores a control program PGA in place of the control program PG. In the second embodiment, the control section 10A functions as the acquisition section 11, the processing section 12, the analysis section 16, the posture evaluation section 17, and the output section 15 by causing a CPU or any other component provided in the control section 10A to execute the control program PGA and operate in accordance with the control program PGA.

The analysis section 16 generates characteristic information representing the characteristics of the projection image G recorded in the captured image C based on the imaging information JS acquired by the acquisition section 11. The characteristic information contains information representing the coordinates of the vertices, the area, and the lengths of the edges that form the contour of the projection image G recorded in the captured image C. The analysis section 16 can, for example, extract the four edges that form the contour of the projection image G recorded in the captured image C by using edge detection, which is known image processing. Out of the extracted edges, the intersection of adjacent edges is extracted as each vertex of the projection image G. The coordinates of the vertices of the projection image G recorded in the captured image C, which form a piece of the characteristic information, are thus generated.

Based on a plurality of pieces of characteristic information generated by the analysis section 16 based on a plurality of pieces of imaging information JS, the posture evaluation section 17 generates characteristic change information representing the degree of differences among the plurality of pieces of characteristic information. The posture evaluation section 17 evaluates whether or not the change in the posture of the projector 1A satisfies the certain criterion based on the generated characteristic change information and the evaluation criterion information JH stored in the storage 20A. The posture evaluation section 17 further generates the evaluation result information based on the result of the evaluation. In the present embodiment, the evaluation result information contains, for example, information representing that the posture of the projector 1A has changed, information representing the direction of the change in the posture of the projector 1A, and information representing the degree of the change in the posture of the projector 1A.

As described above, in the second embodiment, the control section 10A provided in the projector 1A includes the analysis section 16 and the posture evaluation section 17 in addition to the acquisition section 11, the processing section 12, and the output section 15. In the second embodiment, the analysis section 16 and the posture evaluation section 17 correspond to an evaluation section.

Figure 11:
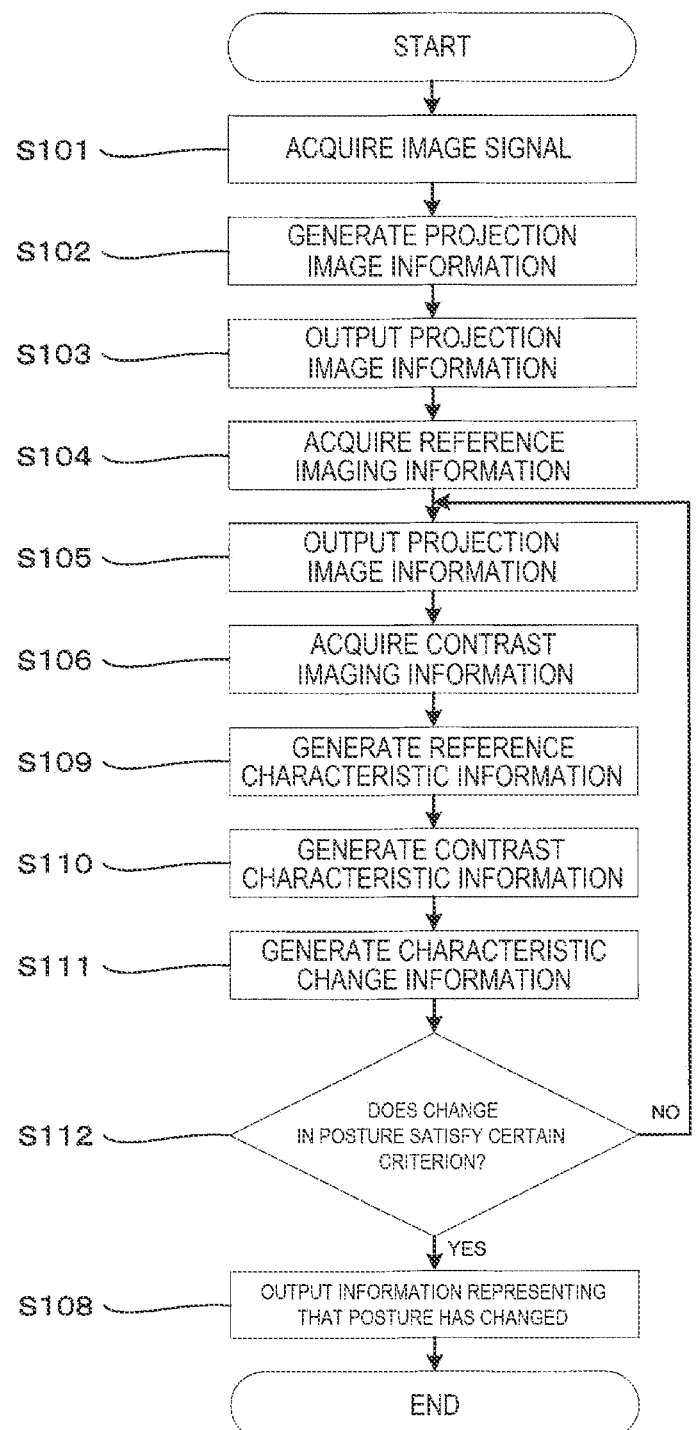
FIG. 11 is a flowchart for describing an overview of the action of the projector according to the second embodiment.

FIG. 11 is a flowchart for describing an overview of the action of the projector 1A according to the second embodiment. The flowchart shown in FIG. 11 is the same as the flowchart shown in FIG. 8 except that the control section 10A carries out the processes in steps S109, S110, S111, and S112 in place of step S107.

In step S109, the analysis section 16 generates the characteristic information representing the characteristics of the first image as reference characteristic information based on the first imaging information acquired by the acquisition section 11 as the reference imaging information in step S104. The characteristic information generated by the analysis section 16 in step S109 is referred to as first characteristic information in some cases.

In step S110, the analysis section 16 generates the characteristic information representing the characteristics of the second image as contract characteristic information based on the second imaging information acquired by the acquisition section 11 as the contrast imaging information in step S106. The characteristic information generated by the analysis section 16 in step S110 is referred to as second characteristic information in some cases.

In step S111, based on the reference characteristic information generated by the analysis section 16 in step S109 and the contrast characteristic information generated by the analysis section 16 in step S110, the posture evaluation section 17 generates characteristic change information representing the degree of a difference between the reference characteristic information and the contrast characteristic information.

In step S112, the posture evaluation section 17 evaluates whether or not the change in the posture of the projector 1A satisfies the certain criterion based on the characteristic change information generated by the posture evaluation section 17 in step S111 and the evaluation criterion information JH stored in the storage 20A. Thereafter, in step S112, the posture evaluation section 17 generates the evaluation result information based on the result of the evaluation. When the result of the evaluation in step S112 is negative, that is, when the result is NO in step S112, the control section 10A proceeds to the process in step S105. When the result of the evaluation in step S112 is affirmative, that is, when the result is YES in step S112, the control section 10A proceeds to the process in step S108.

In step 3108, the output section 15 outputs the output information JO based on the evaluation result information generated by the posture evaluation section 17 in step 3112. The control section 10A then terminates the series of actions shown in the flowchart.

According to the second embodiment, when the change in the posture of the projector 1A satisfies the certain criterion, the output section 15 outputs the output information JO, as in the first embodiment. The change in the posture of the projector 1A can therefore be readily grasped. Therefore, a decrease in the image quality of the projection image G can be suppressed, and malfunction and damage of the projector 1A can be avoided.

As described above, the method for controlling the projector 1A according to the second embodiment includes generating the reference characteristic information representing the characteristics of the first image based on the reference imaging information, generating the contrast characteristic information representing the characteristics of the second image based on the contrast imaging information, and evaluating whether or not the change in the posture of the projector 1A satisfies the certain criterion based on the reference characteristic information and the contrast characteristic information.

The user of the projector 1A can thus readily grasp the change in the posture of the projector 1A.

3. Third Embodiment

A third embodiment of the present disclosure will be described below. In the embodiments presented below by way of example, an element having the same effect and function as those in the second embodiment has the same reference character used in the description of the second embodiment, and no detailed description of the same element will be made as appropriate.

Figure 12:
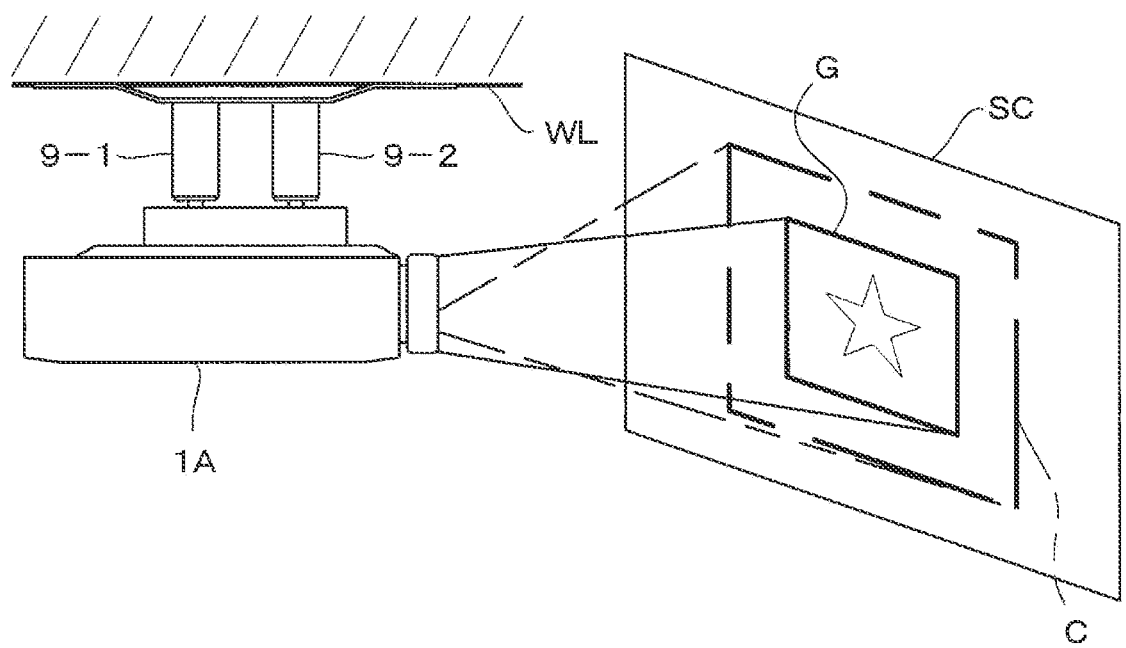
FIG. 12 is a descriptive diagram showing an overview of the projector according to a third embodiment.

FIG. 12 schematically describes an overview of the projector 1A according to the third embodiment. The projector 1A is fixed to the ceiling WL via installers 9-1 and 9-2, which are shown in FIG. 12, and installers 9-3 and 9-4, which are not shown in FIG. 12. The installer 9-2 is installed in a position close to the front side of the projector 1A, as compared with the installer 9-1, as shown in FIG. 12. The installer 9-3 is installed in a position shifted from the installer 9-1 toward the rear side of the plane of view, and the installer 9-4 is installed in a position shifted from the installer 9-2 toward the rear side of the plane of view. In the third embodiment, the installers 9-1, 9-2, 9-3, and 9-4 are collectively referred to as installers 9. The installers 9-1, 9-2, 9-3, and 9-4 each include a dedicated fixture, male and female screws that fix the dedicated fixture to the ceiling WL, and male and female screws that fix the projector 1A to the dedicated fixture.

Figure 13:
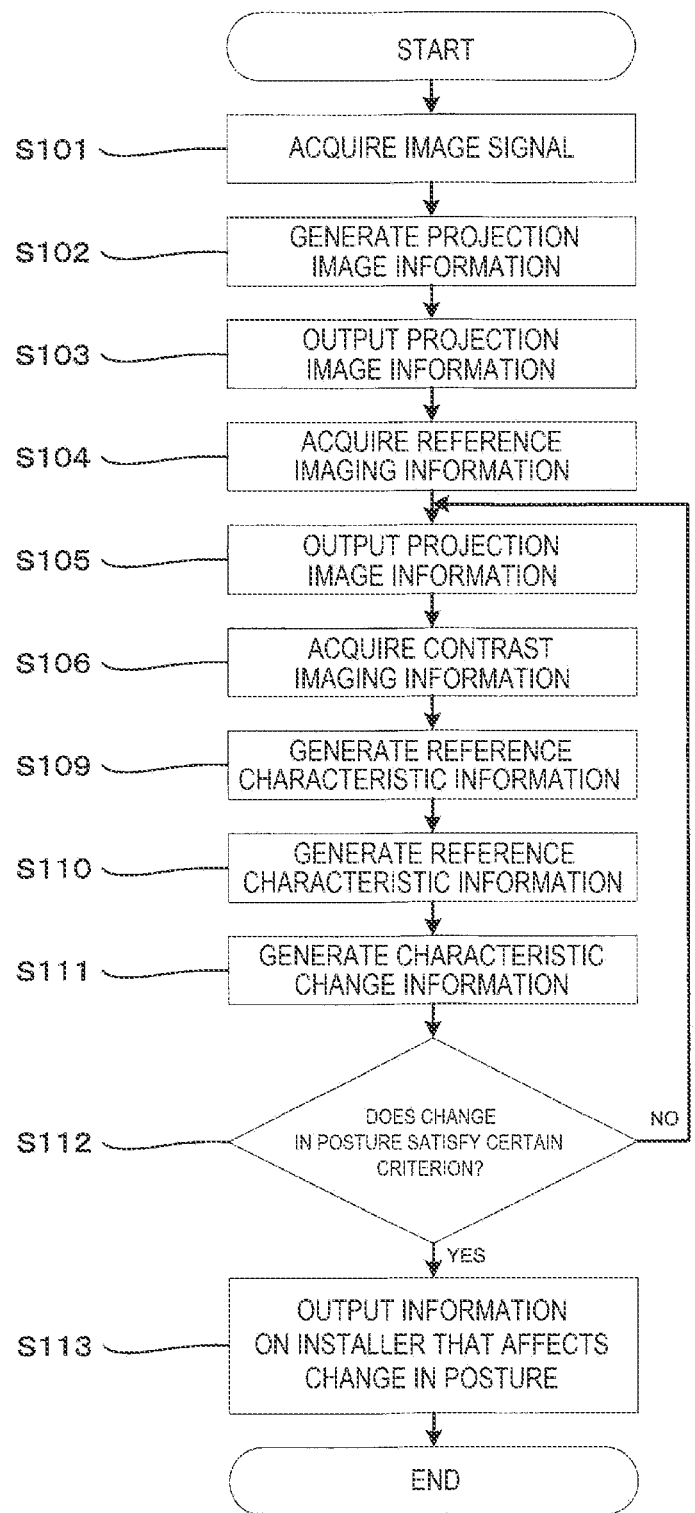
FIG. 13 is a flowchart for describing an overview of the action of the projector according to the third embodiment.

FIG. 13 is a flowchart for describing an overview of the action of the projector 1A according to the third embodiment. A series of actions shown in the flowchart is performed by the projector 1A having the configuration shown in FIG. 10. The flowchart shown in FIG. 13 is the same as the flowchart shown in FIG. 11 except that the control section 10A carries out the process in step S113 in place of step S108.

In step S113, the output section 15 outputs the output information JO based on the evaluation result information generated by the posture evaluation section 17 in step S112. The control section 10A then terminates the series of actions shown in the flowchart.

The evaluation result information generated by the posture evaluation section 17 in step S112 contains the information representing that the posture of the projector 1A has changed, and the information representing the direction of the change in the posture of the projector 1A. Based on correspondence information and the evaluation result information, the output section 15 can output the output information JO containing information on an installer that affects the change in the posture of the projector 1A. The correspondence information is information representing the correspondence between the direction of the change in the posture of the projector 1A and an installer that presumably changes the posture of the projector 1A. The correspondence information may be stored in the storage 20A.

A description will be made below to describe that the evaluation result information contains the information representing the direction of the change in the posture of the projector 1A.

Figure 14:
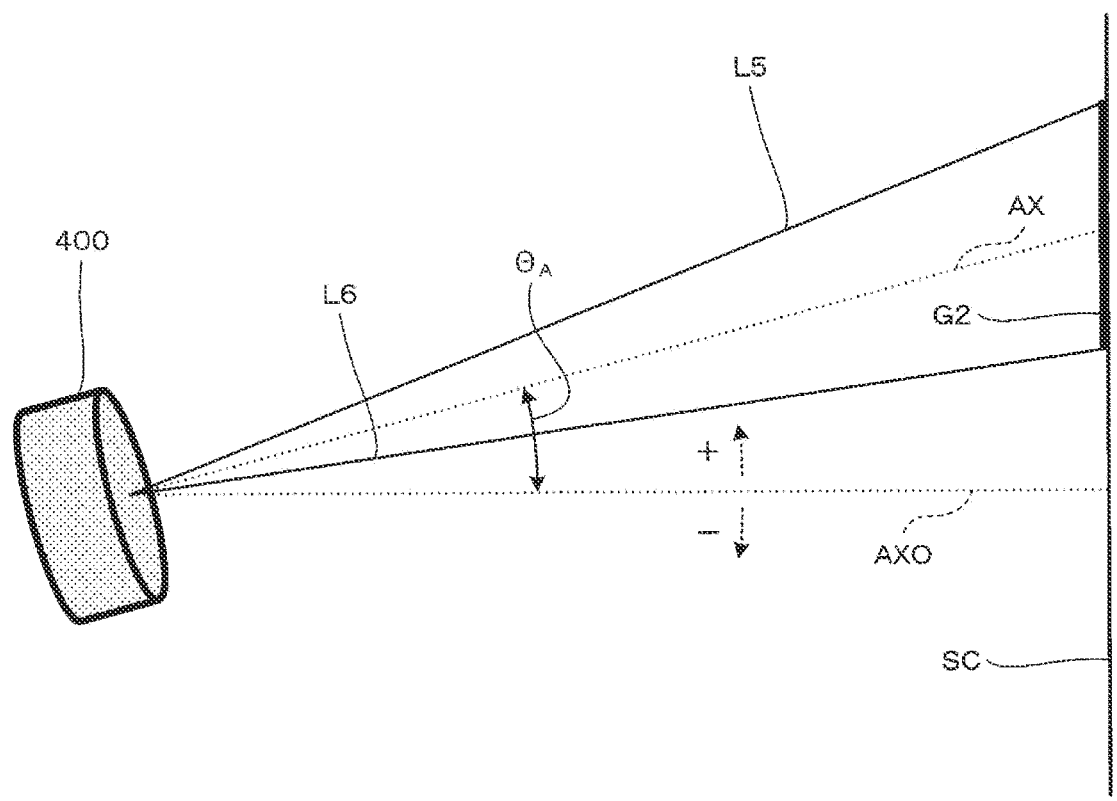
FIG. 14 illustrates a state in which the posture of the projector has changed.

FIG. 14 illustrates the state in which the posture of the projector 1A has changed. The imaging lens 500, the optical axis AY, the distance L7, and the distance L8 are omitted in FIG. 14 for convenience of illustration.

For example, in a case where the front surface of the projector 1A tilts up or down, tilt of the front surface of the projector 1A in the vertical direction is defined as negative tilt. On the other hand, tilt of the front surface of the projector 1A in the opposite direction to the vertical direction is defined as positive tilt. FIG. 14 shows that the projector 1A tilts in the positive direction. In FIG. 14, the optical axis AX tilts in the positive direction by an amount of change $\Theta_A$ from a position of an optical axis AXO before the posture of the projector 1A changes. When the projector 1A tilts in the positive direction, the change in the posture of the projector 1A is denoted as $\Theta_A$. When the projector 1A tilts in the negative direction, the change in the posture of the projector 1A is denoted as $-\Theta_A$. In the evaluation of whether or not the change in the posture of the projector 1A satisfies the certain criterion in step S112, the condition that causes the result of the evaluation to be affirmative can be set as $-\Theta_A \leq \Theta_{T1}$ or $\Theta_{T2} \leq \Theta_A$. In the expression, $-\Theta_{T1}$ and $\Theta_{T2}$ are thresholds for the evaluation of whether the change in the posture of the projector 1A satisfies the certain criterion. $\Theta_A$, $\Theta_{T1}$, and $\Theta_{T2}$ each have a positive value. The evaluation result information contains first, second, and third variables. The first variable is 1 when $-\Theta_A \leq -\Theta_{T1}$ is satisfied, and 0 when the inequality is not satisfied. The second variable is 1 when $\Theta_{T2} \leq \Theta_A$ is satisfied, and 0 when the inequality is not satisfied. The third variable is 1 when $-\Theta_{T1} \leq -\Theta_A$ and $\Theta_A \leq \Theta_{T2}$ are satisfied, and 0 when the inequalities are not satisfied. The first and second variables contained in the evaluation result information are information representing the direction of the change in the posture of the projector 1A.

Figure 15:
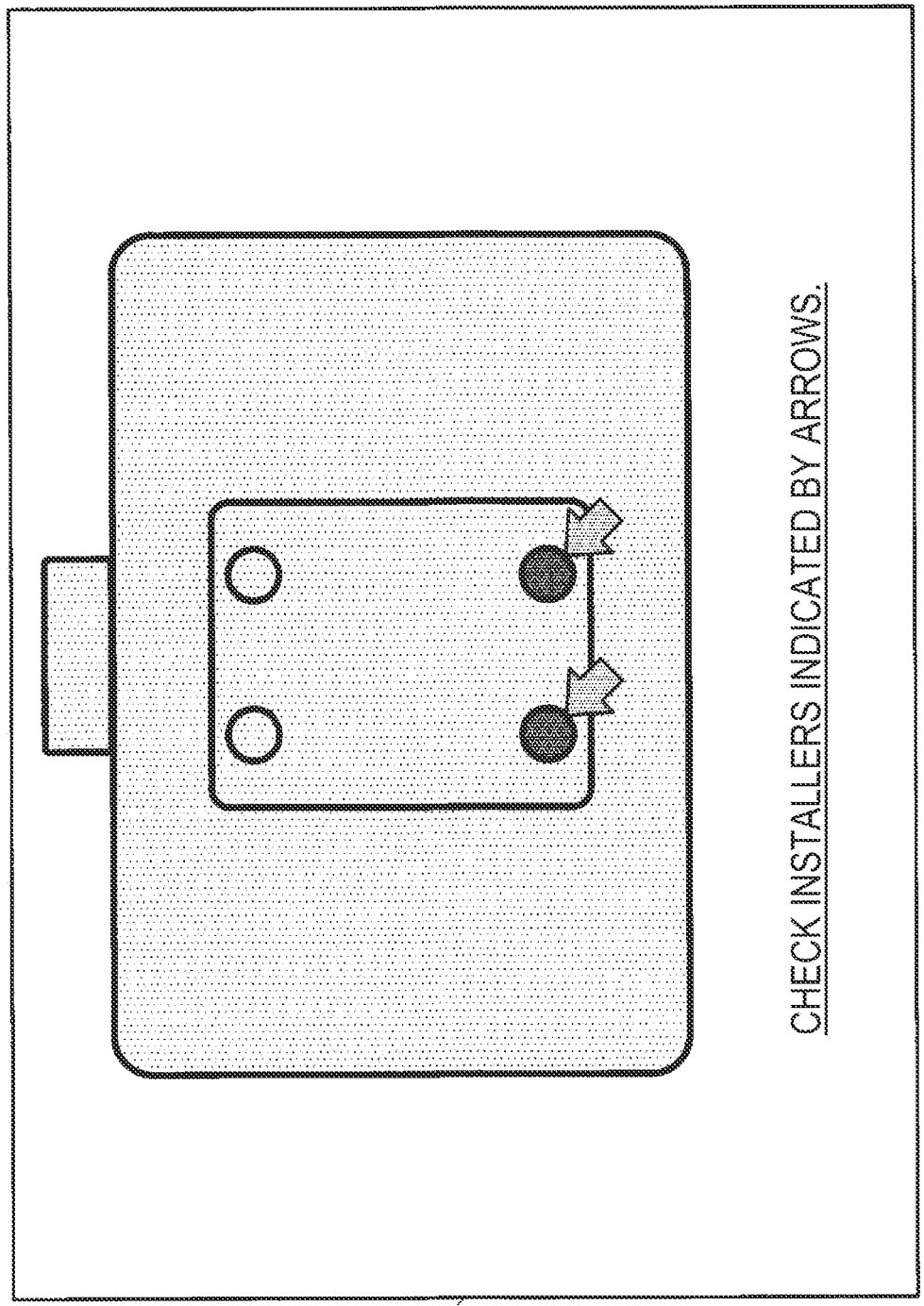
FIG. 15 is a descriptive diagram showing another example of the output information.

FIG. 15 shows output information JO2, which is an example of the output information JO outputted by the output section 15 in step S113 in FIG. 13. The output information JO2 shown in FIG. 15 is image information representing information on the installer that presumably affects the change in the posture of the projector 1A.

According to the third embodiment, when the change in the posture of the projector 1A satisfies the certain criterion, the output section 15 outputs the output information JO containing the information on the installer that affects the change in the posture of the projector 1A. The user of the projector 1A can therefore grasp that the posture of the projector 1A has changed, and can also readily identify the installer 9 that presumably affects the change in the posture of the projector 1A. As a result, in addition to the same effects as those provided by the first and second embodiments, the third embodiment contributes to improvement in the maintainability of the projector 1A.

As described above, the projector 1A according to the third embodiment is fixed at an installation position via the installers 9 formed of the installers 9-1, 9-2, 9-3, and 9-4, and the method for controlling the projector 1A includes evaluating whether or not the change in the posture of the projector 1A satisfies the certain criterion based on the reference characteristic information and the contrast characteristic information, and outputting the information on the installer 9 out of the installers 9 that affects the change in the posture of the projector 1A in accordance with the result of the evaluation.

The user of the projector 1A can thus grasp that the posture of the projector 1A has changed. Furthermore, the user of the projector 1A can readily identify the installer 9 that presumably affects the change in the posture of the projector 1A.

4. Fourth Embodiment

A fourth embodiment of the present disclosure will be described below. In the embodiments presented below by way of example, an element having the same effect and function as those in the third embodiment has the same reference character used in the description of the third embodiment, and no detailed description of the same element will be made as appropriate.

Figure 16:
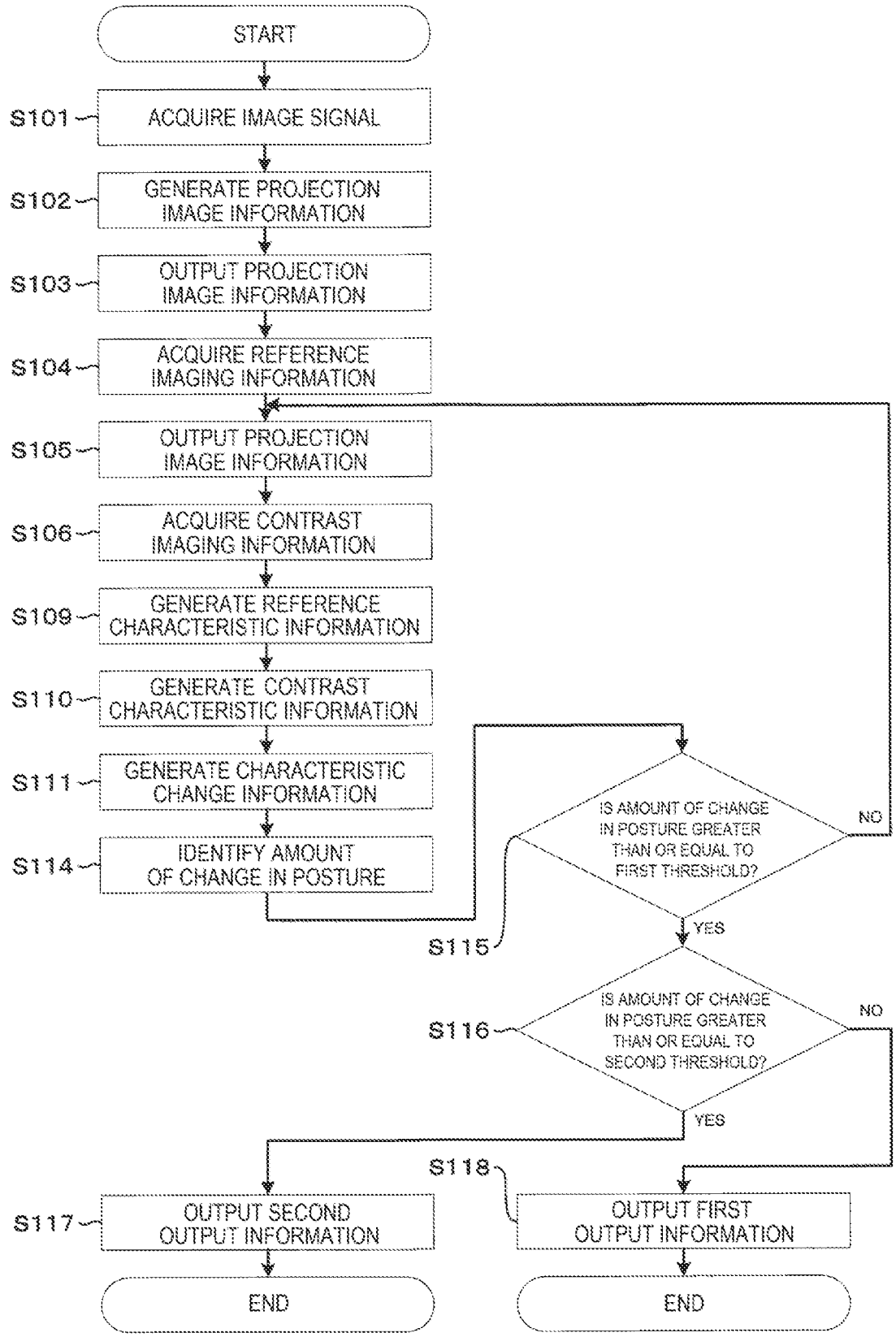
FIG. 16 is a flowchart for describing an overview of the action of the projector according to a fourth embodiment.

FIG. 16 is a flowchart for describing an overview of the action of the projector 1A according to the fourth embodiment. A series of actions shown in the flowchart is performed by the projector 1A having the configuration shown in FIG. 10. In the fourth embodiment, the evaluation criterion information JH contains first threshold information representing a first threshold and second threshold information representing a second threshold greater than the first threshold as the information on the threshold for the evaluation of whether or not the change in the posture of the projector 1A satisfies the certain criterion. The flowchart shown in FIG. 16 is the same as the flowchart shown in FIG. 11 except that the control section 10A carries out the processes in steps S114, S115, S116, S117, and S118 in place of steps S112 and S108.

In step S114, the posture evaluation section 17 identifies the amount of change in the posture of the projector 1A based on the characteristic change information generated by the posture evaluation section 17 in step S111.

In step S115, the posture evaluation section 17 evaluates whether or not the amount of change in the posture of the projector 1A is greater than or equal to the first threshold based on the amount of change in the posture of the projector 1A identified by the posture evaluation section 17 in step S114 and the evaluation criterion information JH stored in the storage 20A. When the result of the evaluation in step S115 is negative, that is, when the result is NO in step S115, the control section 10A proceeds to the process in step S105. When the result of the evaluation in step S115 is affirmative, that is, when the result is YES in step S115, the control section 10A proceeds to the process in step 3116.

In step S116, the posture evaluation section 17 evaluates whether or not the amount of change in the posture of the projector 1A is greater than or equal to the second threshold based on the amount of change in the posture of the projector 1A identified by the posture evaluation section 17 in step S114 and the evaluation criterion information JH stored in the storage 20A. Thereafter, in step S116, the posture evaluation section 17 generates the evaluation result information based on the result of the evaluation. When the result of the evaluation in step S116 is negative, that is, when the result is NO in step S116, the control section 10A proceeds to the process in step S118. When the result of the evaluation in step 3116 is affirmative, that is, when the result is YES in step S116, the control section 10A proceeds to the process in step S117. The state in which the result of the evaluation in step S116 is negative is referred to as a first state in some cases. The state in which the result of the evaluation in step 3116 is affirmative is referred to as a second state in some cases.

In step S117, the output section 15 outputs the output information JO based on the evaluation result information generated by the posture evaluation section 17 in step S116. The control section 10A then terminates the series of actions shown in the flowchart. The output information JO outputted in step S117 is referred to as second output information in some cases. In step S118, the output section 15 outputs the output information JO based on the evaluation result information generated by the posture evaluation section 17 in step S116. The control section 10A then terminates the series of actions shown in the flowchart. The output information JO outputted in step S118 is referred to as first output information in some cases.

Figure 17:
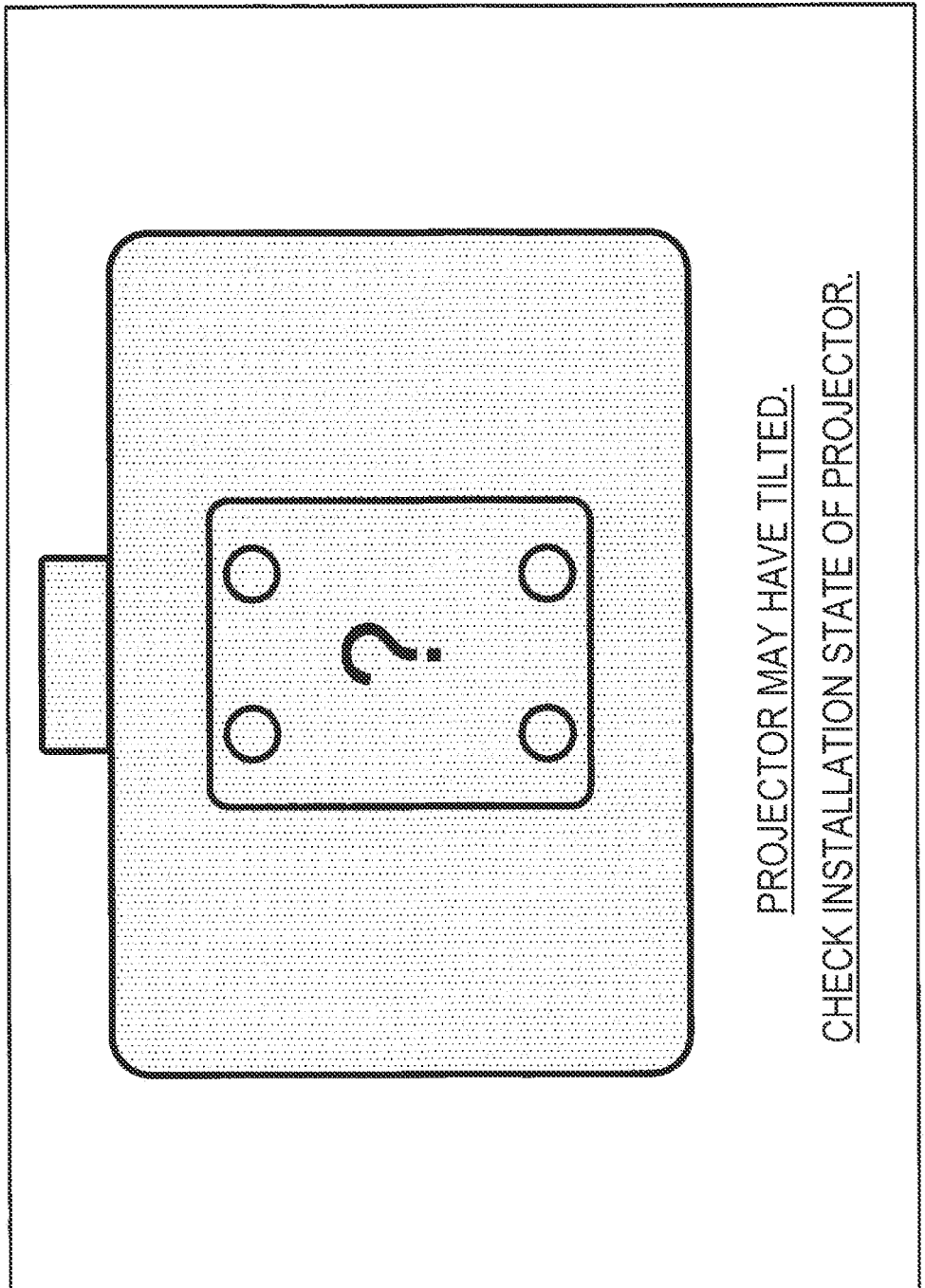
FIG. 17 is a descriptive diagram showing another example of the output information.

FIG. 17 shows output information JO3, which is an example of the first output information. The output information JO3 shown in FIG. 17 is image information that notifies that the posture of the projector 1A has possibly changed. An example of the second output information is the output information JO1 shown in FIG. 9. It is preferable that the second output information outputted in step S117 contains information that more strongly prompts the user to check the installation state of the projector 1A than the first output information outputted in step S118. The second output information outputted in step S117 may instead contain information that more strongly prompts the user to keep a distance from the projector 1A than the first output information outputted in step S118.

According to the fourth embodiment, the output section 15 outputs the output information JO containing a content that varies in accordance with the amount of change in the posture of the projector 1A, whereby the user of the projector 1A can grasp that the posture of the projector 1A has changed and also readily grasp the degree of the change in the posture of the projector 1A. As a result, a more appropriate response can be advantageously selected in accordance with the content of the output information JO.

As described above, the method for controlling the projector 1A according to the fourth embodiment includes identifying the amount of change in the posture of the projector 1A based on the reference characteristic information and the contrast characteristic information, determining the state of the posture is the first state, when the amount of change in the posture of the projector 1A is greater than or equal to the first threshold but smaller than the second threshold, determining the state of the posture is the second state when the amount of change in the posture of the projector 1A is greater than or equal to the second threshold, outputting the first output information when the state of the posture is determined to be the first state, and outputting the second output information when the state of the posture is determined to be the second state.

The user of the projector 1A can thus grasp that the posture of the projector 1A has changed. Furthermore, the user of the projector 1A readily grasps the degree of the change in posture of the projector 1A.

5. Variations

The embodiments described above can be changed in a variety of manners. Specific aspects of the changes will be presented below by way of example. Two or more aspects arbitrarily selected from the examples below may be combined with each other as appropriate to the extent that the aspects do not contradict each other. In the variations presented below by way of example, an element having the same effect and function as those in the embodiments described above has the same reference character used in the above description, and no detailed description of the same element will be made as appropriate.

5.1. Variation 1

The aforementioned embodiments have been described with reference to the case where the imaging apparatus 50 is fixed to the projector 1 or 1A, and when the posture of the projector 1 or 1A changes, the captured image C is acquired without any change in the relative positional relationship between the imaging lens 500 provided in the imaging apparatus 50 and the projection lens 400, but the present disclosure is not limited to the aspect described above. The imaging apparatus 50 may be fixed to a location other than the projector 1 or 1A, and the relative positional relationship between the imaging lens 500 provided in the imaging apparatus 50 and the projection lens 400 may change when the posture of the projector 1 or 1A changes.

Figure 18:
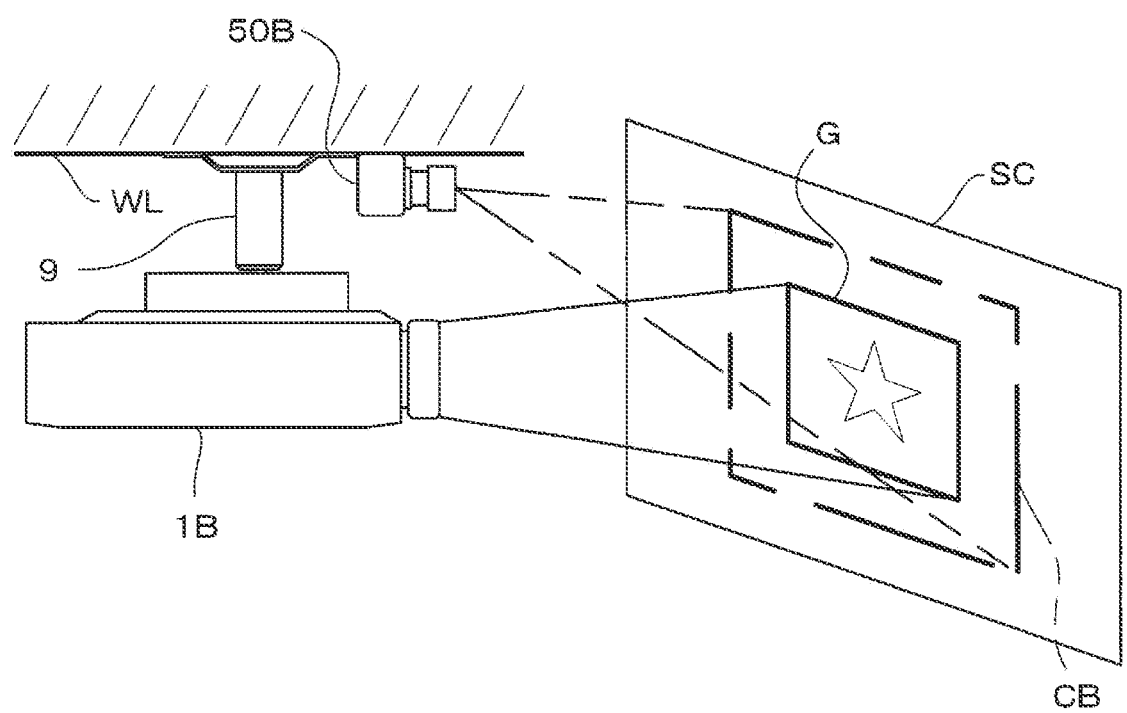
FIG. 18 is a descriptive diagram showing an overview of a projector according to Variation 1.

FIG. 18 describes an overview of a projector 1B according to Variation 1. An image of the projection image G is captured by an imaging apparatus 50B fixed to a location other than the projector 1B, as shown in FIG. 18. The imaging apparatus 50B acquires a captured image CB.

Figure 19:
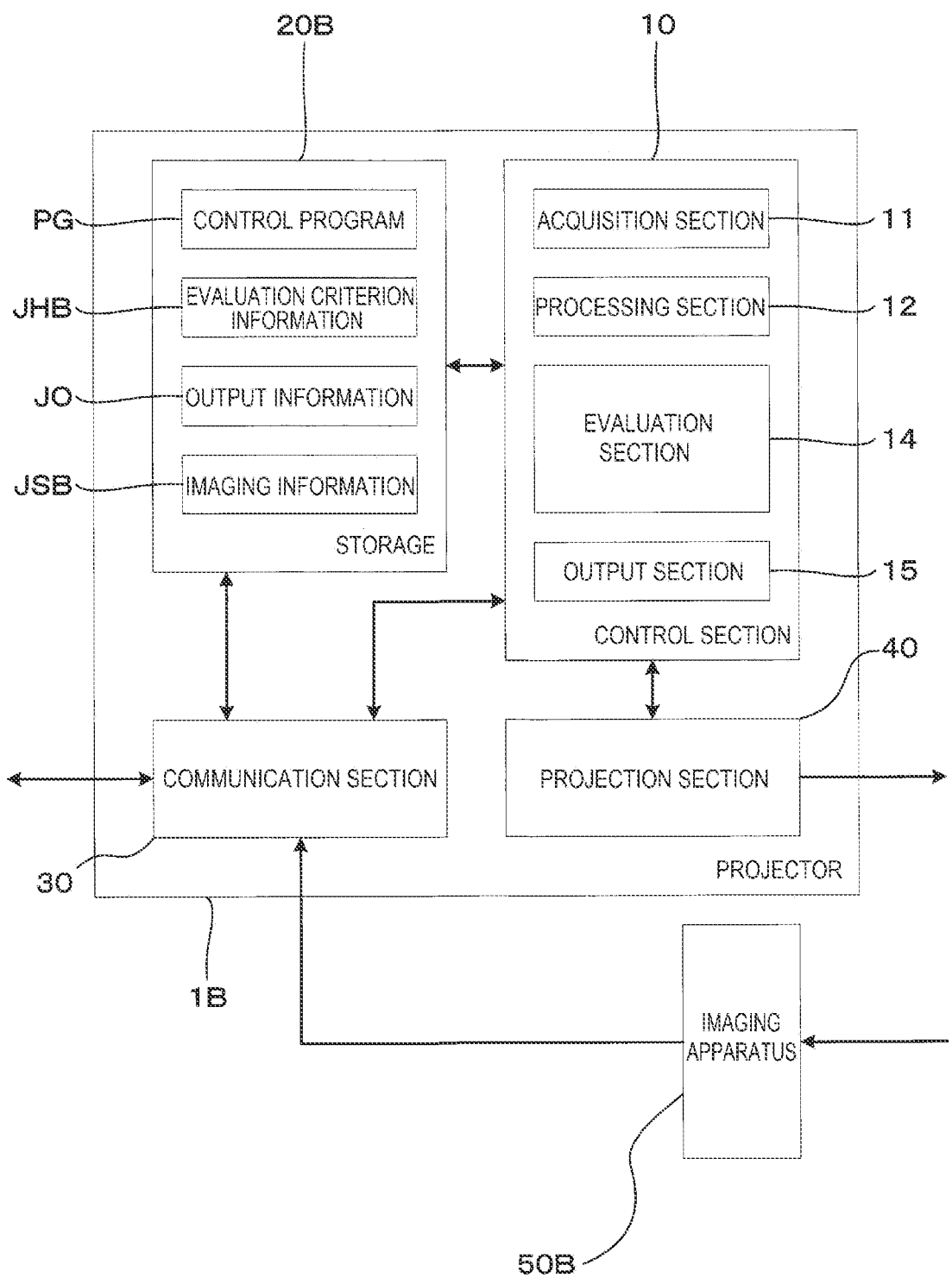
FIG. 19 is a block diagram showing an example of the configuration of the projector according to Variation 1.

FIG. 19 is a block diagram showing an example of the configuration of the projector 1B according to Variation 1. The projector 1B has the same configuration as that of the projector 1 according to the first embodiment except that the projector 1B includes a storage 20B in place of the storage 20 and does not include the imaging apparatus 50, as shown in FIG. 19. The imaging apparatus 50B is fixed to a location outside the projector 1B. Out of the storage 20B and the imaging apparatus 50B, the storage 20B has the same configuration as that of the storage 20 according to the first embodiment except that the storage 20B stores evaluation criterion information JHB in place of the evaluation criterion information JH and imaging information JSB in place of the imaging information JS.

The imaging apparatus 50B is fixed to a location other than the projector 1B and captures an image of the projection image G projected on the screen SC. The imaging apparatus 50B thus acquires the captured image CB. Since the imaging apparatus 50B is fixed at a position different from the position of the projector 1B, it is not necessary to move the location where an image is captured when the posture of the projector 1B changes, and the captured image CB may be acquired in a state in which the relative positional relationship between an imaging lens 500B provided in the imaging apparatus 50B and the projection lens 400 changes. The imaging apparatus 50B may transmit the imaging information JSB, which is information representing the captured image CB, to the projector 1B via wired or wireless transmission.

Figure 20:
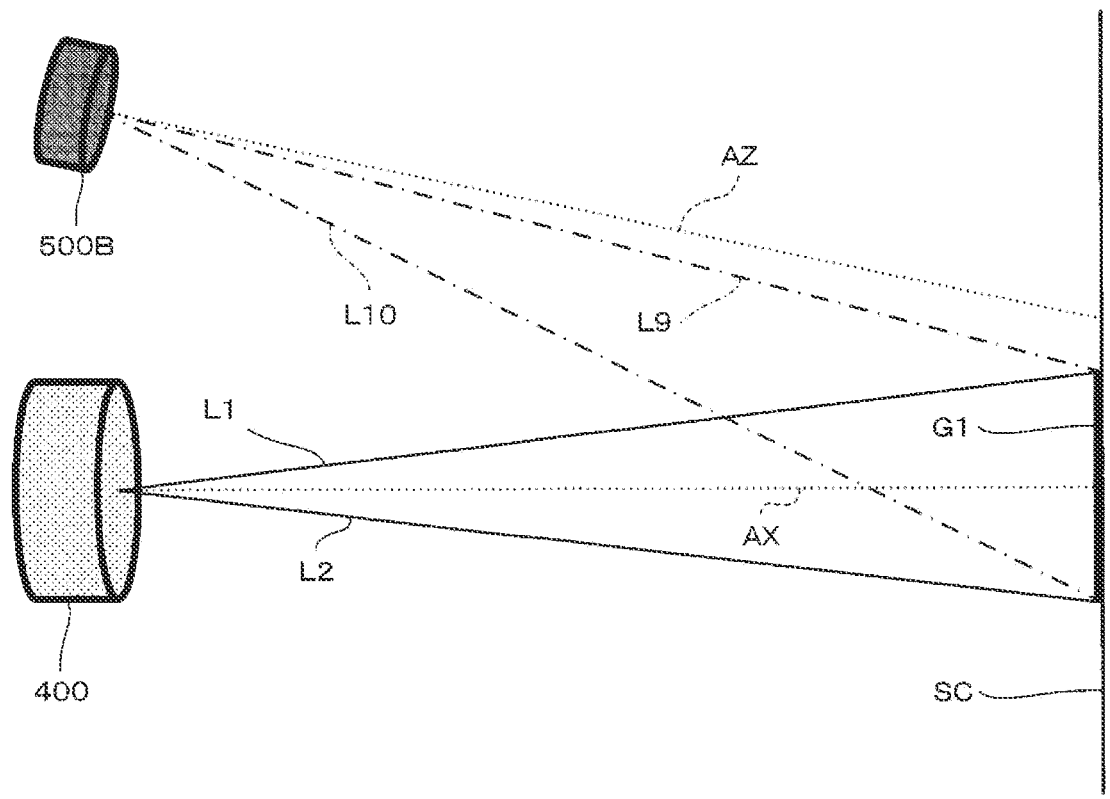
FIG. 20 is a descriptive diagram showing how the projector according to Variation 1 projects an image and captures an image of the projected image.
Figure 21:
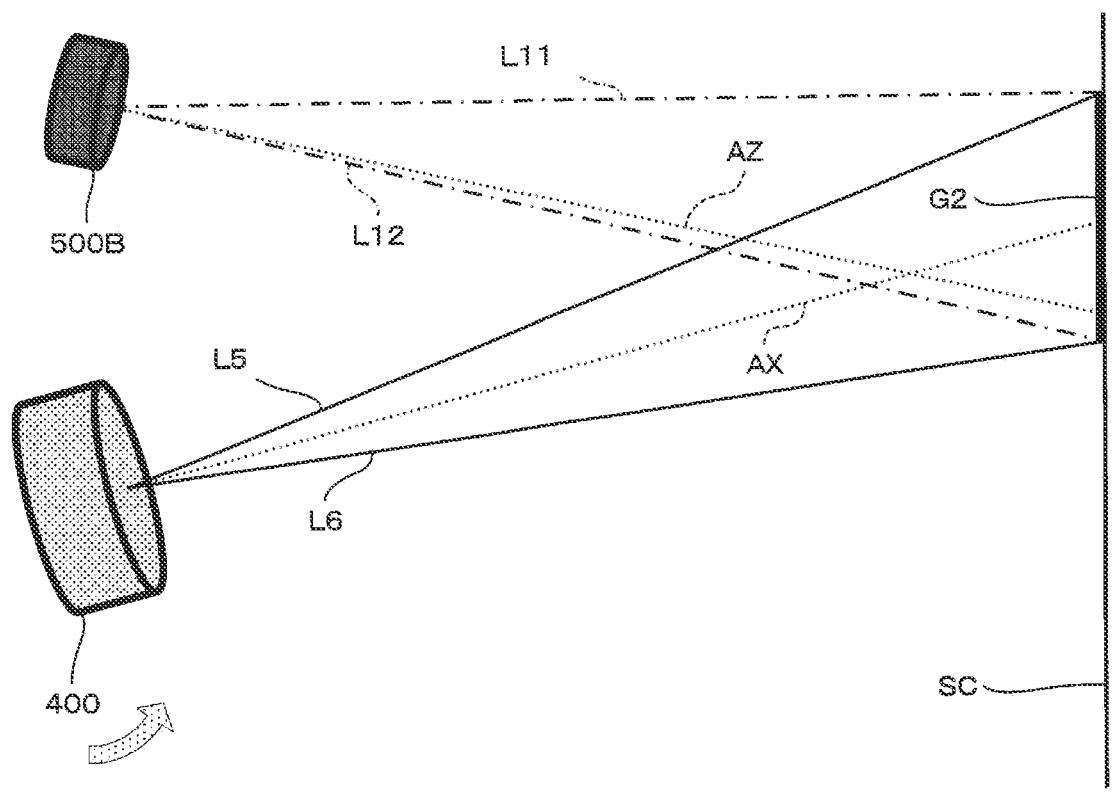
FIG. 21 is a descriptive diagram showing how the projector according to Variation 1 projects an image and captures an image of the projected image.

FIGS. 20 and 21 show how the projector 1B according to Variation 1 projects an image and captures an image of the projected image.

FIG. 20 shows the positional relationship among the screen SC, projection lens 400, and imaging lens 500B. The optical axis AX of the projection lens 400 intersects with the screen SC at right angles. On the other hand, the optical axis AX of the projection lens 400 and an optical axis AZ of the imaging lens 500B may not be parallel to each other, as shown in FIG. 20. FIG. 20 also shows that the imaging lens 500B is provided in a position different in the vertical direction from the projection lens 400. In FIG. 20, the projection image G projected from the projection section 40 onto the screen SC is referred to as a projected image G1. Let L1 be the distance from the intersection of the projection lens 400 and the optical axis AX to the upper edge of the projected image G1, as shown in FIG. 20. Let L2 be the distance from the intersection of the projection lens 400 and the optical axis AX to the lower edge of the projected image G1. Let L9 be the distance from the intersection of the imaging lens 500B and the optical axis AZ to the upper edge of the projected image G1. Let L10 be the distance from the intersection of the imaging lens 500B and the optical axis AZ to the lower edge of the projected image G1.

FIG. 21 shows that the posture of the projector 1B has changed from the posture shown in FIG. 20, and that the intersection of the optical axis AX and the screen SC has moved in the direction opposite to the vertical direction relative to the intersection of the optical axis AX and the projection lens 400. The imaging apparatus 50B including the imaging lens 500B is fixed to a location other than the projector 1B, and the point where the optical axis AZ of the imaging lens 500B intersects with the screen SC does not change from the position shown in FIG. 20. In FIG. 21, the projection image G projected from the projection section 40 onto the screen SC is referred to as a projected image G2. Let L5 be the distance from the intersection of the projection lens 400 and the optical axis AX to the upper edge of the projected image G2, as shown in FIG. 21. Let L6 be the distance from the intersection of the projection lens 400 and the optical axis AX to the lower edge of the projected image G2. Let L11 be the distance from the intersection of the imaging lens 500B and the optical axis AZ to the upper edge of the projected image G2. Let L12 be the distance from the intersection of the imaging lens 500B and the optical axis AZ to the lower edge of the projected image G2.

When the posture of the projector 1B changes from the state in FIG. 20 to the state in FIG. 21, the shape of the projection image G recorded in the captured image CB changes based on the ratio of the distance L1 to the distance L2, the ratio of the distance L5 to the distance L6, the ratio of the distance L9 to the distance L10, and the ratio of the distance 11 to the distance L12, as described in Section 1.3. Since the shape of the captured projection image changes as the posture of the projector 1B changes, the change in the posture of the projector 1B can be grasped based on the change in the shape of the image recorded in the captured image, as in the first embodiment.

As described above, the projector 1B according to Variation 1 includes the acquisition section, which acquires the first imaging information representing the result of image capture of the first image projected from the projector 1B at the first timing and the second imaging information representing the result of image capture of the second image projected from the projector 1B at the second timing from the imaging apparatus fixed to a location other than the projector 1B, the evaluation section, which evaluates whether or not the change in the posture of the projector 1B satisfies the certain criterion based on the reference imaging information and the contrast imaging information, and the output section, which outputs the output information JO based on the evaluation result generated by the evaluation section in accordance with the evaluation result.

The user of the projector 1B can thus grasp that the posture of the projector 1B has changed.

5.2. Variation 2

The aforementioned embodiments and Variation 1 have been described with reference to the case where the characteristic information contains the coordinates of the vertices, the area, and the lengths of the edges that form the contour of the projection image G recorded in the captured image C, but the present disclosure is not limited to the aspect described above. The characteristic information may be information representing the angle between two or more edges that form the contour of the projection image G recorded in the captured image C.

Figure 22:
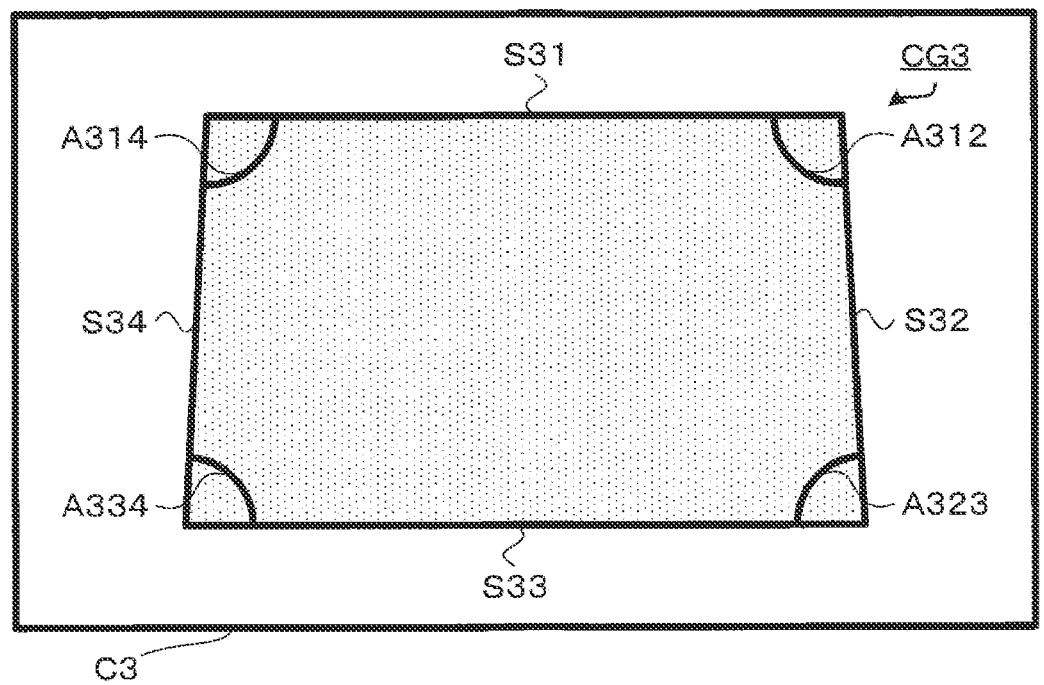
FIG. 22 is a descriptive diagram showing the projection image recorded in the captured image.

FIG. 22 shows a captured image C3 captured before the posture of the projector 1A changes and an image CG3 recorded in the captured image C3. The image CG3 is a projected image G3 projected on the screen SC before the posture of the projector 1A changes and recorded in the captured image C3. The image CG3 has edges S31, S32, S33, and S34, as shown in FIG. 22. Out of the angles formed by the adjacent edges S31 and S32, the interior angle in the image CG3 is referred to as an angle A312. Out of the angles formed by the adjacent edges S32 and S33, the interior angle in the image CG3 is referred to as an angle A323. Out of the angles formed by the adjacent edges S33 and S34, the interior angle in the image CG3 is referred to as an angle A334. Out of the angles formed by the adjacent edges S31 and S34, the interior angle in the image CG3 is referred to as an angle A314. In Variation 2, the edge S31 is an example of a first edge, and the edge S32 is an example of a second edge. An angle of the angle A312 is an example of a first angle.

Figure 23:
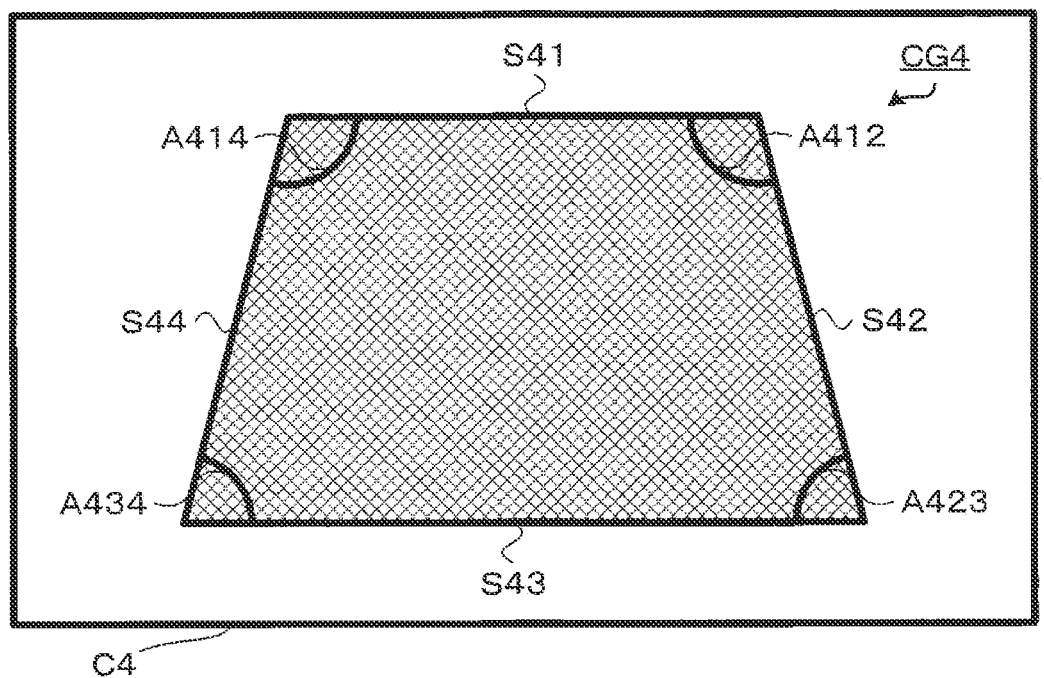
FIG. 23 is a descriptive diagram showing the projection image recorded in the captured image.

FIG. 23 shows a captured image C4 acquired after the posture of the projector 1A changes and an image CG4 recorded in the captured image C4. The image CG4 is a projected image G4 projected on the screen SC after the posture of the projector 1A changes and recorded in the captured image C4. The image CG4 has edges S41, S42, S43, and S44, as shown in FIG. 23. The edge S41 corresponds to the edge S31. The edge S42 corresponds to the edge S32. Out of the angles formed by the adjacent edges S41 and S42, the interior angle in the image CG4 is referred to as an angle A412. Out of the angles formed by the adjacent edges S42 and S43, the interior angle in the image CG4 is referred to as an angle A423. Out of the angles formed by the adjacent edges S43 and S44, the interior angle in the image CG4 is referred to as an angle A434. Out of the angles formed by the adjacent edges S41 and S44, the interior angle in the image CG4 is referred to as an angle A414. In Variation 2, the edge S41 is an example of a third edge, and the edge S42 is an example of a fourth edge. An angle of the angle A412 is an example of a second angle.

In Variation 2, the analysis section 16 generates the angle of the angle A312 as the reference characteristic information in step S109 in the flowchart shown in FIG. 11. In step S110, the analysis section 16 generates the angle of the angle A412 as the contrast characteristic information.

Thereafter, in step S111, the posture evaluation section 17 generates the characteristic change information representing the degree of the difference between the angle of the angle A312 indicated by the reference characteristic information and the angle of the angle A412 indicated by the contrast characteristic information.

Thereafter, in step S112, the posture evaluation section 17 evaluates whether or not the change in the posture of the projector 1A satisfies the certain criterion based on the degree of the difference between the angle of the angle A312 and the angle of the angle A412 indicated by the characteristic change information.

As described above, in the method for controlling the projector 1A according to Variation 2, the reference characteristic information contains information representing the first angle between the adjacent first and second edges out of the two or more edges that form the contour of the first image, the contrast characteristic information contains information representing the second angle between the third edge corresponding to the first edge and the fourth edge corresponding to the second edge out of the two or more edges that form the contour of the second image, and whether or not the change in the posture of the projector 1A satisfies the certain criterion is evaluated based on the degree of the difference between the first and second angles.

The user of the projector 1A can thus readily grasp the change in the posture of the projector 1A.

5.3. Variation 3

The aforementioned embodiments and Variation 1 have been described with reference to the case where the characteristic information contains the coordinates of the vertices, the area, and the lengths of the edges that form the contour of the projection image G recorded in the captured image C, but the present disclosure is not limited to the aspect described above. The characteristic information may be information based on brightness of two or more edges that form the contour of the projection image G recorded in the captured image C.

As described above, the shape of the projection image G recorded in the captured image C changes as the posture of the projector 1 changes. However, not only the shape of the projection image G recorded in the captured image C, but also the brightness of two or more edges that form the contour of the projection image G recorded in the captured image C changes as the posture of the projector 1 changes. The behavior described above results from the fact that the brightness of the projection image G on the screen SC and the amount of light reflected off the screen SC and reaching the imaging lens 500 changes as the distances L1, L2, L5, and L6 and the distances L3, L4, L7, and L8 shown in FIG. 4 change. Since information on the brightness recorded in the captured image C changes as the posture of the projector 1 changes, the change in the posture of the projector 1 can be grasped based on the change in the brightness of two or more edges that form the contour of the projection image G recorded in the captured image C.

In Variation 3, in step S104 in the flowchart shown in FIG. 11, the acquisition section 11 acquires, as the reference imaging information, the imaging information JS that is information showing the captured image C3 shown in FIG. 22 described above. The image CG3 has the edges S31, S32, S33, and S34, as shown in FIG. 22. In Variation 3, the edge S31 is an example of the first edge, and the edge S33 is an example of the second edge.

In Variation 3, in step S106 in the flowchart shown in FIG. 11, the acquisition section 11 acquires, as the contrast imaging information, the imaging information JS that is information showing the captured image C4 shown in FIG. 23 described above. The image CG4 has the edges S41, S42, S43, and S44, as shown in FIG. 23. The edge S41 corresponds to the edge S31. The edge S43 corresponds to the edge S33. In Variation 3, the edge S41 is an example of the third edge, and the edge S43 is an example of the fourth edge.

In Variation 3, the analysis section 16 generates first difference information as the reference characteristic information in step S109 in the flowchart shown in FIG. 11. The analysis section 16 further generates second difference information as the contrast characteristic information in step S110 in the flowchart shown in FIG. 11. The first difference information is information representing the degree of the difference in brightness between the edges S31 and S33. The second difference information is information representing the degree of the difference in brightness between the edges S41 and S43. The first and second difference information can be the difference in brightness between two target edges, or the ratio between the two edges in terms of brightness.

The brightness at each of the edges that form the contours of the images CG3 and CG4 may be, as an approximation, the average brightness of the pixels that form the image CG3 or CG4 and fall within the rectangular range whose one of long edges coincides with the edge. It is assumed that the rectangular whose one of long edges coincides with the edge is so set that the short edges are sufficiently shorter than the long edges and the number of pixels that form the image CG3 or CG4 and fall within the rectangular range is maximized.

Thereafter, in step S111, the posture evaluation section 17 generates the characteristic change information representing the first difference information indicated by the reference characteristic information and the second difference information indicated by the contrast characteristic information.

Thereafter, in step S112, the posture evaluation section 17 evaluates whether or not the change in the posture of the projector 1A satisfies the certain criterion based on the degree of the difference between the first difference information and the second difference information indicated by the characteristic change information.

As described above, in the method for controlling the projector 1A according to Variation 3, the reference characteristic information contains the first difference information representing the degree of the difference in brightness between the first and second edges out of the two or more edges that form the contour of the first image, the contrast characteristic information contains the second difference information representing the degree of the difference in brightness between the third edge corresponding to the first edge and the fourth edge corresponding to the second edge out of the two or more edges that form the contour of the second image, and whether or not the change in the posture of the projector 1A satisfies the certain criterion is evaluated based on the first and second difference information.

The user of the projector 1A can thus readily grasp the change in the posture of the projector 1A.

5.4. Variation 4

The aforementioned embodiments and variations have been described with reference to the case where the output information JO is outputted as image information. The output information JO is, however, not limited to the one displayed on the entire range of the projection image G projected on the screen SC, the display provided in the external terminal and the like. The output information JO may be displayed, for example, as part of the projection image G or the display.

Figure 24:
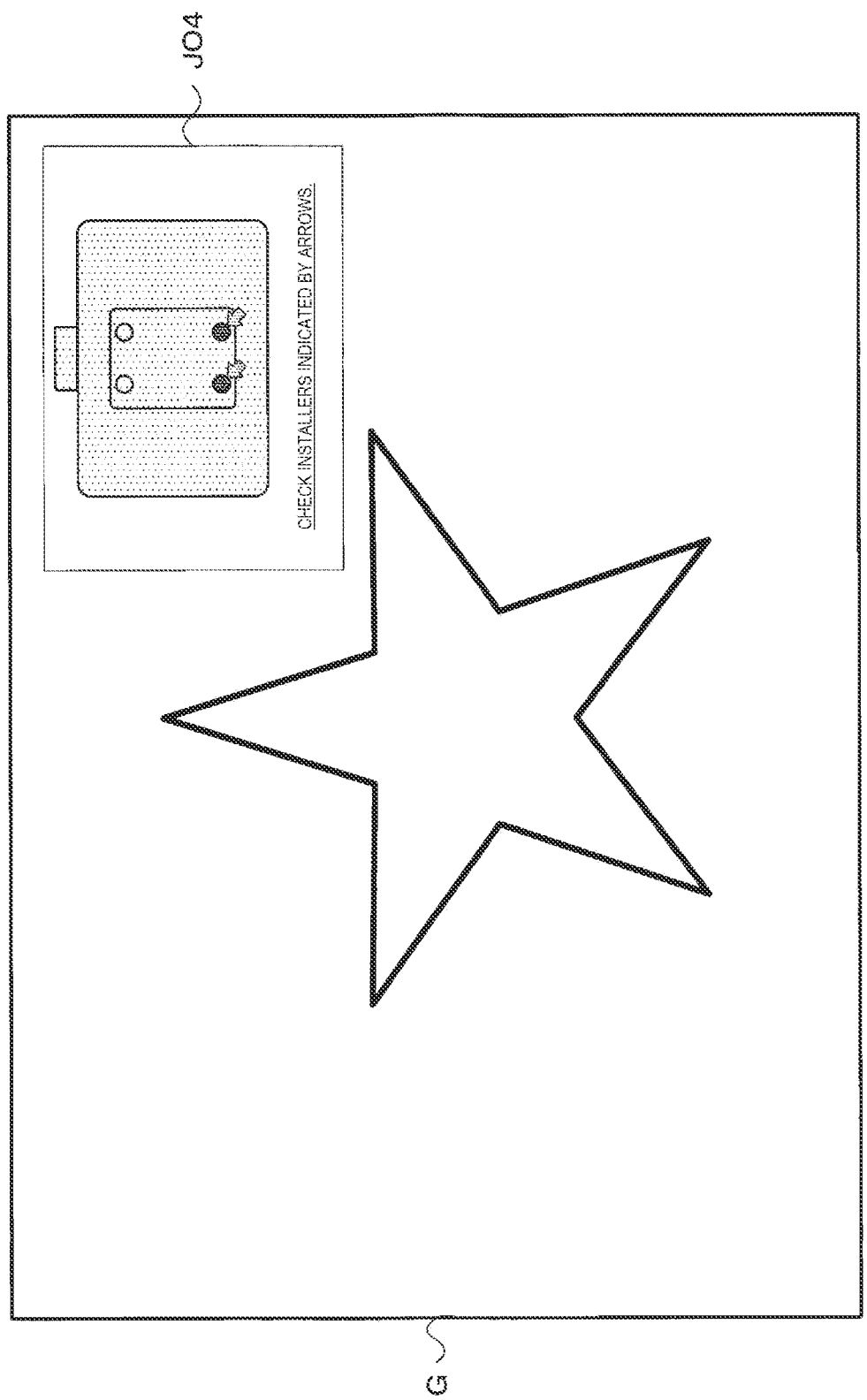
FIG. 24 is a descriptive diagram showing another example of the output information.

FIG. 24 shows output information JO4, which is an example of the output information JO outputted as part of the projection image G projected on the screen SC with the aid of on-screen display. The output information JO4 shown in FIG. 24 is displayed so as to be superimposed on the projection image G at an upper right portion thereof. The output information JO displayed, for example, as part of the projection image G or the display may be text information.

5.5. Variation 5

In the embodiments and variations described above, a projector, such as the projectors 1, 1A, and 1B, may include a touch panel that displays an operation screen GS, which allows the user of the projector to input operation to the projector. The projector may instead be configured to project the operation screen GS from the projection section 40 onto the screen SC to display the operation screen GS, and the user of the projector may use a remote control that is not shown to input operation performed on the operation screen GS.

Figure 25:
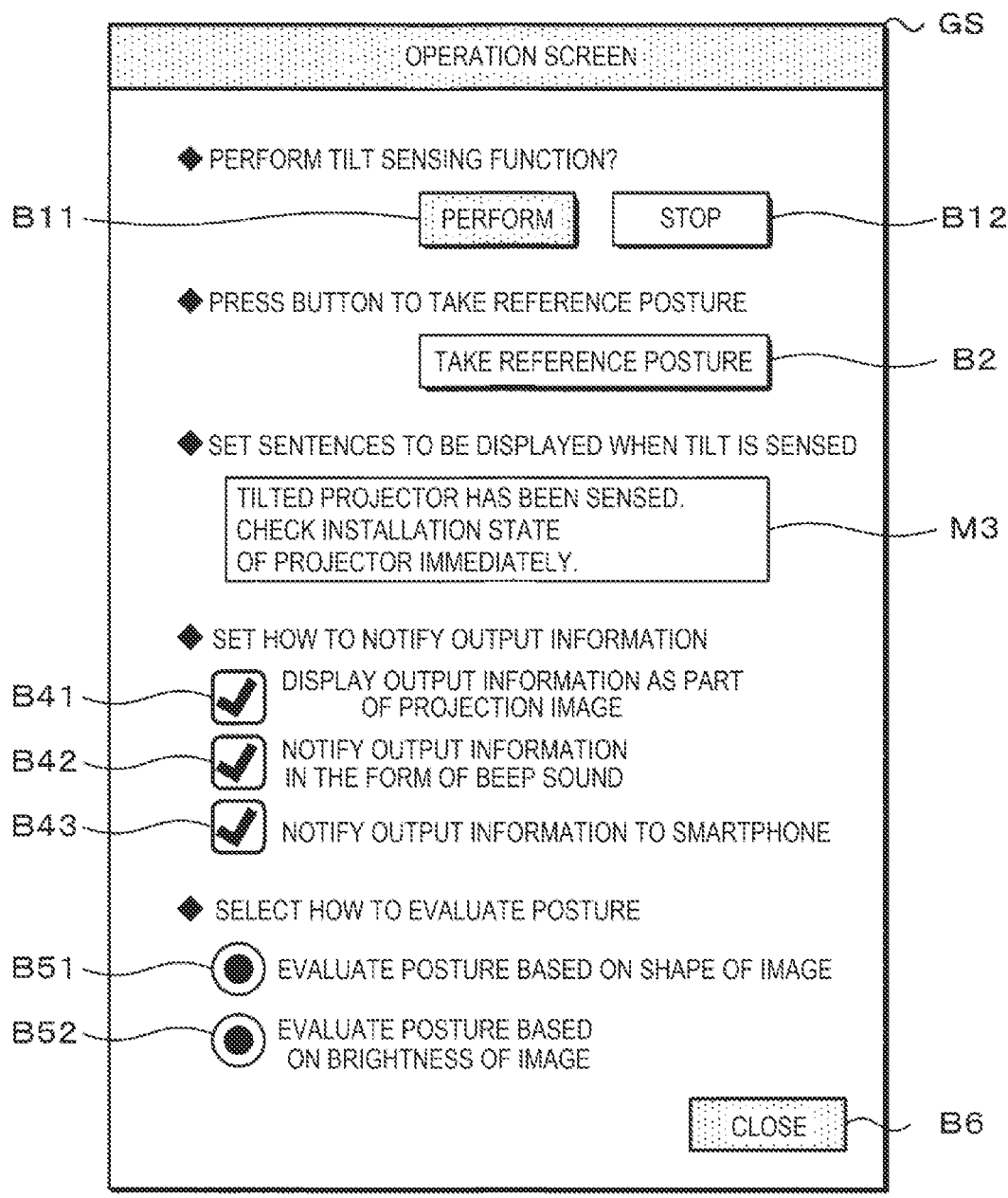
FIG. 25 is a descriptive diagram showing an example of an operation screen.

FIG. 25 is a descriptive diagram showing an example of the operation screen GS. The operation screen GS has a button B11 for instructing the projector to perform the operation of evaluating whether or not the change in the posture of the projector satisfies the certain criterion, and a button B12 for instructing the projector to stop the operation, as shown in FIG. 25. The operation screen GS further has a button B2 for specifying the current posture of the projector as a reference posture. When the projector takes the reference posture and projects the projection image G onto the screen SC, the imaging information JS, which represents the captured image C, which is an image of the projection image G captured by the imaging apparatus 50, can be regarded as the reference imaging information.

The operation screen GS has an input region M3, to which words indicated by the output information JO are inputted. The operation screen GS further has checkboxes B41 to B43, which allows the user to set how to notify the output information JO. When the user of the projector selects the checkbox B41, the output information JO is outputted in the form of the projection image G. When the user of the projector selects the checkbox B41, the output information JO is outputted in the form of the projection image G. When the user of the projector selects the checkbox B42, the output information JO is outputted in the form of voice. When the user of the projector selects the checkbox B43, the output information JO is notified to a mobile terminal that the user of the projector possesses.

The operation screen GS has radio buttons B51 and B52, which allows the user to set how to evaluate whether or not the change in the posture of the projector satisfies the certain criterion. When the user of the projector selects the radio button B51, the control section provided in the projector evaluates whether or not the change in the posture of the projector satisfies the certain criterion based on the shape of any of the images CG recorded in the captured image C. On the other hand, when the user of the projector selects the radio button B52, the control section provided in the pro- jector evaluates whether or not the change in the posture of the projector satisfies the certain criterion based on the brightness of any of the images CG recorded in the captured image C.

The operation screen GS has a button B6, which allows the user to stop inputting operation to the projector.

What is claimed is:

1. A projector controlling method comprising:
   acquiring first imaging information obtained by capturing a first image projected from a projector at a first timing, wherein first characteristic information representing characteristics of the first image is generated based on the first imaging information, wherein the projector is fixed at an installation position via two or more installers;
   acquiring second imaging information obtained by capturing a second image projected from the projector at a second timing, wherein second characteristic information representing characteristics of the second image is generated based on the second imaging information;
   evaluating whether or not a change in a posture of the projector satisfies a certain criterion based on the first imaging information and the second imaging information, wherein the evaluation is further based on the first characteristic information and the second characteristic information; and
   outputting information based on a result of the evaluating, the information including information on an installer out of the two or more installers that affects the change in the posture of the projector.

2. The projector controlling method according to claim 1, wherein the first characteristic information contains information representing a first angle between adjacent first edge and second edge out of two or more edges that form a contour of the first image,
   the second characteristic information contains information representing a second angle between a third edge corresponding to the first edge and a fourth edge corresponding to the second edge out of two or more edges that form a contour of the second image, and
   whether or not the change in the posture of the projector satisfies the certain criterion is evaluated based on a degree of a difference between the first angle and the second angle.

3. The projector controlling method according to claim 1, wherein the first characteristic information contains first difference information representing a degree of a difference in brightness between first edge and second edge out of two or more edges that form a contour of the first image,
   the second characteristic information contains second difference information representing a degree of a difference in brightness between a third edge corresponding to the first edge and a fourth edge corresponding to the second edge out of two or more edges that form a contour of the second image, and
   whether or not the change in the posture of the projector satisfies the certain criterion is evaluated based on the first difference information and the second difference information.

4. The projector controlling method according to claim 1, wherein an amount of change in the posture of the projector is identified based on the first characteristic information and the second characteristic information,
   it is determined to be a first state when an amount of change in the posture of the projector is greater than or equal to a first threshold and smaller than a second threshold greater than the first threshold, it is determined to be a second state when the amount of change in the posture of the projector is greater than or equal to the second threshold, and first output information is outputted when the state of the posture is determined to be the first state, and second output information is outputted when the state of the posture is determined to be the second state.

5. A projector comprising one or more processors programmed to:

acquire first imaging information obtained by capturing a first image projected from the projector at a first timing from a camera fixed to the projector, wherein first characteristic information representing characteristics of the first image is generated based on the first imaging information, wherein the projector is fixed at an installation position via two or more installers;

acquire second imaging information obtained by capturing a second image projected from the projector at a second timing from the camera, wherein second characteristic information representing characteristics of the second image is generated based on the second imaging information;

evaluate whether or not a change in a posture of the projector satisfies a certain criterion based on the first imaging information and the second imaging information, wherein the evaluation is further based on the first characteristic information and the second characteristic information; and output information based on a result of the evaluation.

6. A projector comprising one or more processors programmed to:

acquire first imaging information obtained by capturing a first image projected from the projector at a first timing from a camera fixed to a location other than the projector, wherein first characteristic information representing characteristics of the first image is generated based on the first imaging information, wherein the projector is fixed at an installation position via two or more installers;

acquire second imaging information obtained by capturing a second image projected from the projector at a second timing from the camera, wherein second characteristic information representing characteristics of the second image is generated based on the second imaging information;

evaluate whether or not a change in a posture of the projector satisfies a certain criterion based on the first imaging information and the second imaging information, wherein the evaluation is further based on the first characteristic information and the second characteristic information; and output information based on a result of the evaluation, the information including information on an installer out of the two or more installers that affects the change in the posture of the projector.

* * * * *